(12) United States Patent
Young et al.

(10) Patent No.: US 12,012,290 B2
(45) Date of Patent: Jun. 18, 2024

(54) SYSTEM AND METHOD FOR AUTOMATED SORTATION

(71) Applicant: Aegis Sortation, LLC, Louisville, KY (US)

(72) Inventors: Anthony J. Young, Louisville, KY (US); Jeffrey Paul Henley, Louisville, KY (US); Kevin Raney, Louisville, KY (US); Robert Browder, Louisville, KY (US); Marvin Gregory Whitlock, Louisville, KY (US); Scott Crance, Louisville, KY (US); Ken Ice, Louisville, KY (US); Michael Karaglanis, Louisville, KY (US); Brian Yount, Louisville, KY (US); Barry Sweatt, Louisville, KY (US); Thomas M. Phillips, Louisville, KY (US); Logan Young, Louisville, KY (US)

(73) Assignee: AGEGIS SORTATION, LLC, Louisville, KY (US)

( * ) Notice: Subject to any disclaimer, the term of this patent is extended or adjusted under 35 U.S.C. 154(b) by 94 days.

(21) Appl. No.: 18/092,226

(22) Filed: Dec. 31, 2022

(65) Prior Publication Data
US 2023/0159281 A1 May 25, 2023

Related U.S. Application Data

(63) Continuation-in-part of application No. 17/843,313, filed on Jun. 17, 2022, which is a continuation of
(Continued)

(51) Int. Cl.
B65G 47/19 (2006.01)
B65G 47/26 (2006.01)
B65G 47/48 (2006.01)

(52) U.S. Cl.
CPC .......... *B65G 47/19* (2013.01); *B65G 47/268* (2013.01); *B65G 47/48* (2013.01);
(Continued)

(58) Field of Classification Search
None
See application file for complete search history.

(56) References Cited

U.S. PATENT DOCUMENTS

| 4,832,204 A | 5/1989 | Handy |
| 4,971,513 A | 11/1990 | Bergerioux et al. |

(Continued)

FOREIGN PATENT DOCUMENTS

| CN | 112547558 A | 3/2021 |
| FR | 2832654 A1 | 5/2003 |

(Continued)

*Primary Examiner* — William R Harp
(74) *Attorney, Agent, or Firm* — Dickinson Wright PLLC

(57) ABSTRACT

System and method are provided where parcels or packages are associated or grouped, into logical group or logical containerization of parcels or packages, without need for physical container, such that parcels or packages can be tracked as a group, for example with a unique group ID. Logical group may be tracked within specified logical zone on conveyor, transported, sorted and/or otherwise processed as unique logical group without need to be contained in physical container. System and method for automated sortation can accumulate set number or set volume of packages, and then process the accumulated set number or volume of packages, including automatically closing a container filled with the packages.

39 Claims, 55 Drawing Sheets

Related U.S. Application Data application No. 17/566,527, filed on Dec. 30, 2021, now Pat. No. 11,731,169.

(60) Provisional application No. 63/216,340, filed on Jun. 29, 2021.

(52) U.S. Cl.
CPC ............... *B65G 2201/0285* (2013.01); *B65G 2203/0241* (2013.01); *B65G 2203/044* (2013.01)

(56) References Cited

U.S. PATENT DOCUMENTS

| | | |
|---|---|---|
| 5,444,749 A | 8/1995 | Nambu |
| 5,545,001 A | 8/1996 | Capdeboscq |
| 5,672,039 A | 9/1997 | Perry et al. |
| 5,839,566 A | 11/1998 | Bonnet |
| 5,943,841 A * | 8/1999 | Wunscher ............ B65G 1/1376 53/238 |
| 6,688,459 B1 | 2/2004 | Bonham et al. |
| 6,762,382 B1 | 7/2004 | Danelski |
| 6,853,876 B2 | 2/2005 | Wehrung et al. |
| 6,946,612 B2 | 9/2005 | Morikawa |
| 7,165,377 B2 | 1/2007 | Gillet et al. |
| 7,568,572 B2 | 8/2009 | Zeitler et al. |
| 7,653,457 B2 | 1/2010 | Bloom |
| 7,735,631 B2 | 6/2010 | Berdelle-Hilge |
| 7,778,721 B2 | 8/2010 | Englhardt et al. |
| 8,827,082 B2 | 9/2014 | Radema et al. |
| 8,868,232 B2 | 10/2014 | Freudelsperger |
| 9,422,119 B1 | 8/2016 | Fortenbery et al. |
| 9,738,450 B2 | 8/2017 | Lyon et al. |
| 10,322,438 B2 | 6/2019 | Engel et al. |
| 10,758,943 B1 | 9/2020 | Carpenter |
| 10,846,652 B2 | 11/2020 | Wahlmeier et al. |
| 10,875,057 B2 | 12/2020 | Wagner et al. |
| 2020/0160011 A1 | 5/2020 | Wagner et al. |

FOREIGN PATENT DOCUMENTS

| | | |
|---|---|---|
| JP | 3795674 B2 | 1/2000 |
| JP | 3785272 B2 | 3/2006 |
| WO | 2012/175193 A1 | 12/2012 |
| WO | 2017/207231 A1 | 12/2017 |
| WO | 2020/219261 A1 | 10/2020 |

\* cited by examiner

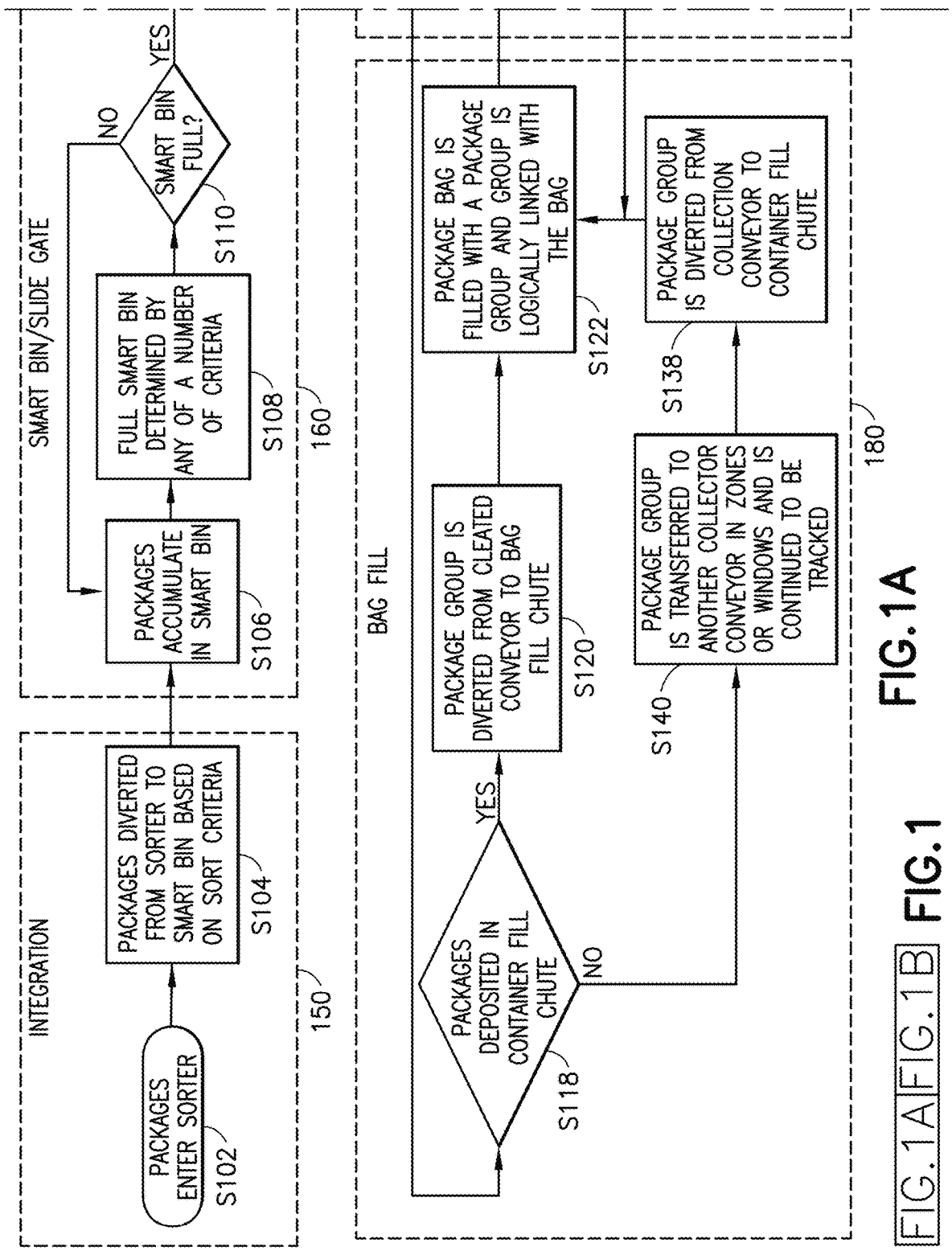

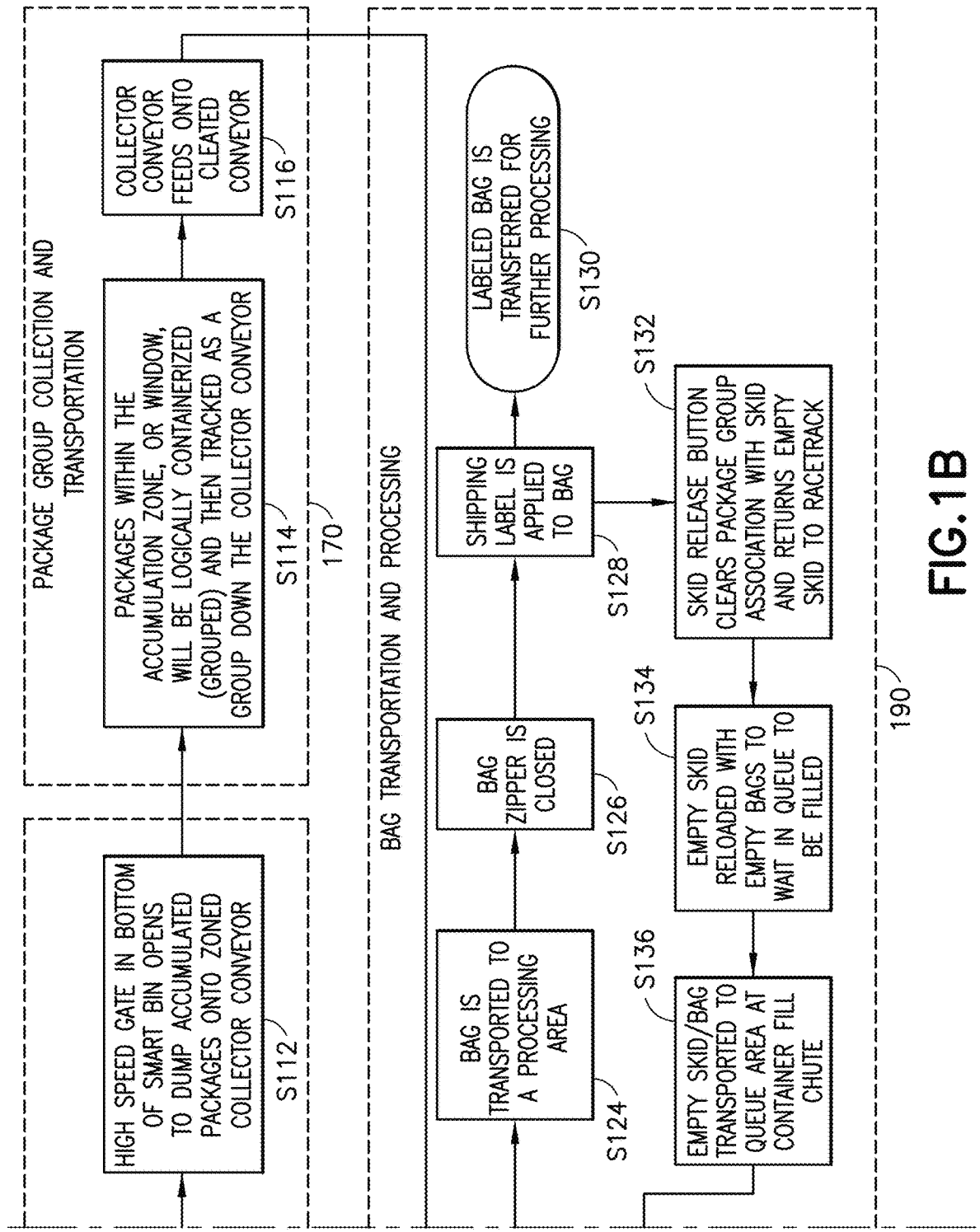

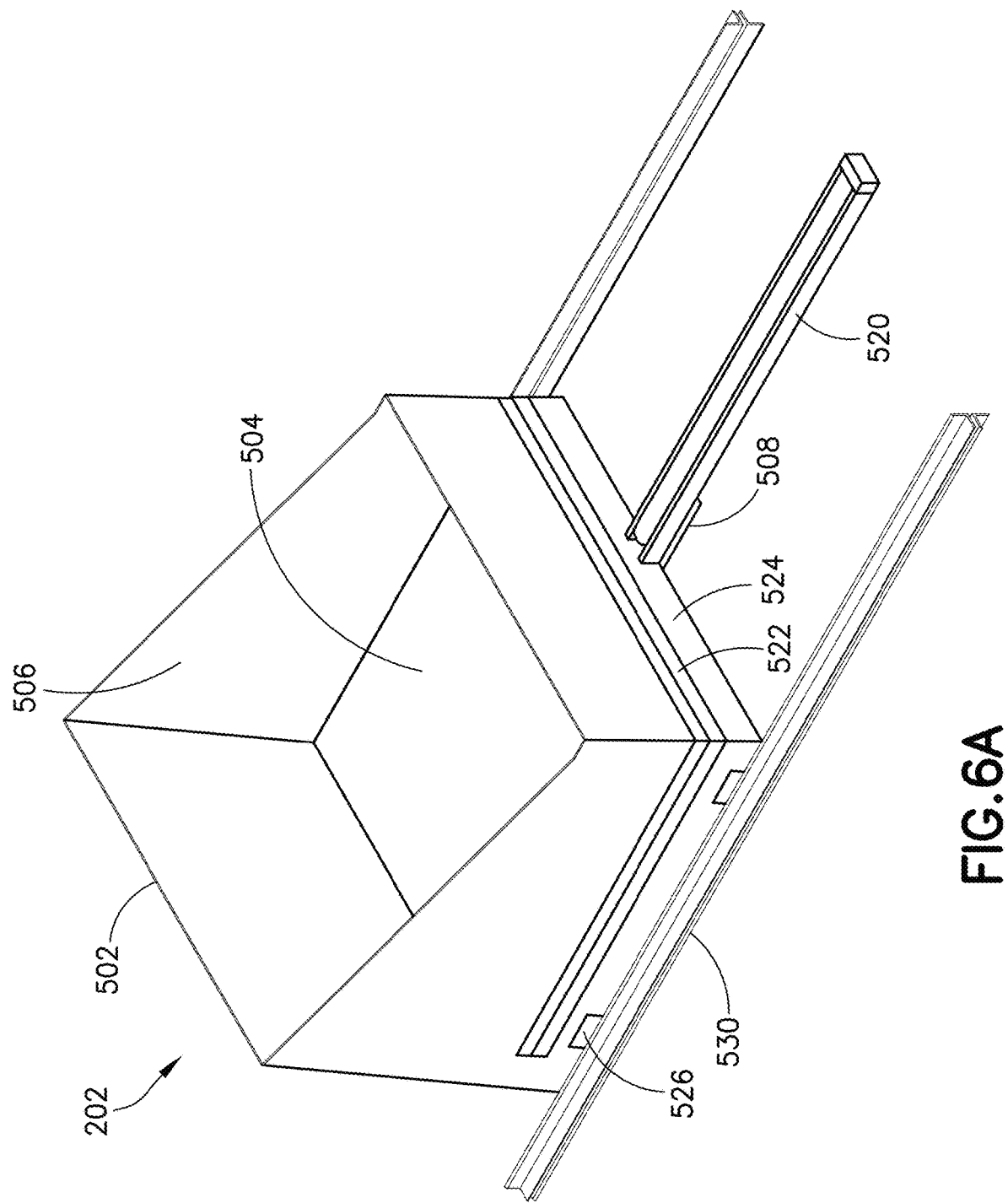

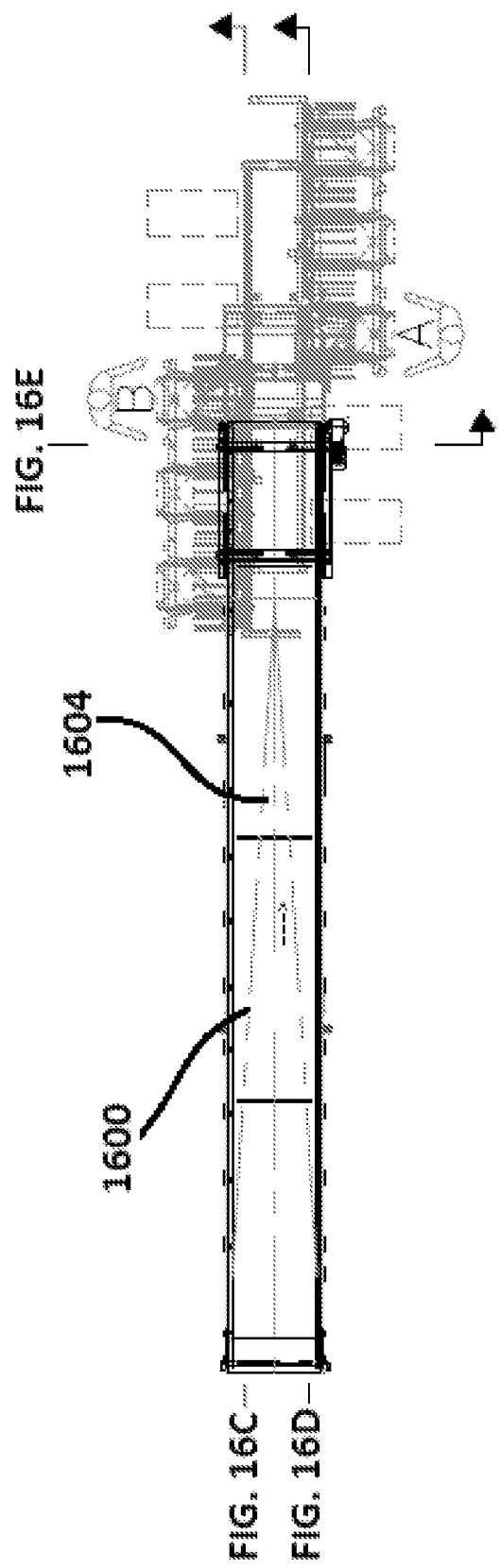

SYSTEM AND METHOD FOR AUTOMATED SORTATION

CROSS-REFERENCE TO RELATED APPLICATION

This Application is a continuation in part of U.S. patent applications Ser. Nos. 17/843,313 filed on Jun. 17, 2022, which is a continuation of U.S. patent applications Ser. Nos. 17/566,527 filed on Dec. 30, 2021, which claims the benefit of U.S. Provisional Application No. 63/216,340, filed Jun. 29, 2021 in the United States Patent Office, the entire disclosures of all of which (including all attachments thereto) are incorporated herein by reference.

BACKGROUND

1. Field

Apparatuses and methods consistent with example embodiments relate to conveyors and conveyor operation, and more particularly sortation conveyor systems where smaller packages are accumulated into groups of packages in an automated consolidated bagging system.

2. Description of the Related Art

Related art automated sorters of smaller packages (hereinafter "smalls sorters") used in conventional sortation systems divert loose small packages into bags to be accumulated. Once a specified number of packages accumulate in a bag or other container (hereinafter simply referred to as a "bag"), the bag is then logically and physically closed, all of the identifications (IDs) and information associated with the packages are associated with the bag and are logically stored. Then, a label is printed and applied to the outside of the bag so the packages in the bag can be tracked as a group within the bag, all such packages being associated with the bag ID. However, such smalls sorters may be undesirably less effective and less efficient because packages often miss the bag they are intended for, resulting in a miss-sorted package. This may require the use of additional material, such as an additional bag, and requires manual intervention, for example, to monitor and close the bag and then to move the bag for further processing on a conveyor system, to help direct packages into the bags, as well as dealing with packages that miss the bags.

SUMMARY

Example embodiments may address at least the above problems and/or disadvantages and other disadvantages not described above. Also, example embodiments are not required to overcome the disadvantages described above, and may not overcome any of the problems described above.

One or more example embodiments may provide a system and method allowing accumulation of packages into groups for further processing or tracking in a bagless and/or containerless manner.

One or more example embodiments may address at least such drawbacks as described above by providing systems and methods that remove the need to have loose packages accumulate into bags of an automated sortation device, such as a tilt-tray sorter or straight line shoe sorter, Activated Roller Belt™(ARB™) sorter, and a pop-up wheel sorter.

One or more example embodiments may provide a system and method in which systems a number of parcels or packages are associated or grouped, without a need for a physical bag or container, such that the parcels or packages can be tracked as a group, for example with a unique group ID. According to an example aspect, an association of parcels or packages may be referred to as a logical group or a logical containerization of parcels or packages. A logical group may be tracked within a specified logical zone, for example on a conveyor, may be transported, may be sorted and/or may otherwise be processed as a unique logical group without a need to be contained in a physical bag or container.

One or more example embodiments may provide a system and method for automated sortation that can accumulate a set number of packages, or a set volume of packages, and then transfer the accumulated set number or volume of packages to a collector conveyor.

One or more example embodiments may provide a conveyor system comprising a smart bin that will accumulate a set number of packages and then transfer the packages, via a direct vertical drop, into a logical accumulation zone on a collector conveyor, thereby allowing for a quick transfer of the packages onto another conveyance system. This may decrease the opportunities for packages to miss a physical bag or container, resulting in a possibly miss-sorted package. The packages transferred to the accumulation zone may be tracked as a group, though they are not all within a same physical container such as a bag.

One or more example embodiments may provide a conveyor system and method in which packages are transferred to an accumulation zone, and the transferred packages are then tracked down a collector conveyor from which, for example, the packages may be fed onto a cleated conveyor with cleated zones or windows, for example to be elevated, and then transferred to another collector conveyor in zones, continuing to be tracked to a point at which the packages are transferred into a splitting hopper with an A/B flip gate to be diverted off to one of two chutes, or with an A/B/C flip gate to be diverted off intone of three shoots. In an example implementation of one or more embodiments, canvas guides and special lever and tusks can be provided to help hold a closeable container, such as bag, open for proper filling of the container where the group of package IDs can then be logically linked to that closable container, with a unique container ID, and a label can be printed and placed on the closable container for tracking from that point forward.

According to an aspect of an example embodiment, a smart bin system comprises: a smart bin comprising: a plurality of walls and a bottom, together defining a cavity therewithin; wherein the bottom comprises a gate moveable between a closed position configured to retain an item within the cavity, and an open position configured to allow an item to fall from within the cavity through the bottom; and a controller, functionally coupled to the gate and configured to move the gate between the closed position and the open position based on received data.

In an exemplary implementation, the received data may comprise a signal received at an input of the controller from an optical sensor, the signal indicating that the smart bin is full.

In an exemplary implementation, the received data may comprise a volume of each of one or more packages within the smart bin.

According to an aspect of an example embodiment, an automated sortation system comprises: a plurality of smart bins each configured to receive a package group, comprising at least one package of a plurality of packages, and to transfer the package group onto a collector conveyor; the collector conveyor, disposed at least partially beneath the plurality of smart bins and configured to convey the package group onto a cleated conveyor; the cleated conveyor configured to convey the package group into a hopper; the hopper comprising a gate configured to drop the package group into one of two or three bag fill chutes.

Each of the plurality of smart bins may comprise a plurality of walls and a bottom, together defining a cavity therewithin; wherein the bottom comprises a gate moveable between a closed position configured to retain an item within the cavity, and an open position configured to allow an item to fall from within the cavity onto the collector conveyor.

According to an aspect of an example embodiment, an automated sortation method comprises: diverting a package group, comprising at least one package of a plurality of packages, into one smart bin of a plurality of smart bins according to a sort criteria; accumulating one or more of the plurality of packages in at least the one smart bin; transferring the one or more of the plurality of packages as a package group comprising the one or more of the plurality of packages from the one smart bin onto a collector conveyor; moving the package group along the collector conveyor for further processing as the package group.

According to an example implementation, the transferring of the package group comprises emptying the one or more of the accumulated packages from the smart bin onto the collector conveyor based on at least one of a signal received from an optical sensor, a total volume of packages within the one smart bin, and a total number of packages within the one smart bin.

According to an example implementation, automated sortation method can further comprise moving the package group along the collector conveyor and onto a cleated conveyor; moving the package group along the cleated conveyor and into a hopper; releasing each package of the package group from the hopper into one of a plurality of chutes, and thereby into a bag.

The transferring the package group from the one smart bin onto the collector conveyor may comprise opening a gate of the one smart bin and thereby dropping the package group from the one smart bin onto the collector conveyor.

The transferring the package group from the one smart bin onto the collector conveyor may comprise transferring the package group onto a defined zone on the collector conveyor.

The moving the package group along the collector conveyor may comprise maintaining the package group within the defined zone on the collector conveyor;

The defined zone on the collector conveyor may be defined between cleats on the collector conveyor.

The defined zone on the collector conveyor may comprises a logical accumulation zone on the collector conveyor, the logical accumulation zone lacking physical constraints on the collector conveyor.

According to one or more example embodiments, an electromechanical system is provided comprising a computer processor, a sensor and a robotic arm, wherein when a package group is conveyed for further processing including transferring into a container a plurality of the packages of the package group, the electromechanical system closes the container by a robotic arm or other automated closure system controlled by a computer processor based on stored or communicated information or commands, which can be based on input from the sensor. In an example implementation of one or more example embodiments the sensor can by indicative of fill amount of the container, or a position of the container, or both. One or more sensors, such as visual sensors, can be deployed in any of example configurations, and an associated image or video processing can be performed by the computer processor, or remotely and communicated to the computer processor.

BRIEF DESCRIPTION OF THE DRAWINGS

The above and/or other aspects will become apparent and more readily appreciated from the following description of example embodiments, taken in conjunction with the accompanying drawings, in which:

FIG. 1, which is comprised of FIGS. 1A and 1B, is a flow chart of an automated sortation method according to an example embodiment;

FIGS. 5H-5J are a side view, a perspective view, and a bottom view of an example carousel according to an example embodiment;

FIGS. 6A, 6B, and 6C are different perspective views of a smart bin according to an example embodiment;

FIG. 9C shows a detail of a portion of FIG. 9B;

FIGS. 16A, 16B, 16C, 16D, and 16E illustrate, respectively, an isometric view, enlarged schematic plan view and various cross section and enlarged views, of a system according to yet another example embodiment;

DETAILED DESCRIPTION

Figure 2A:
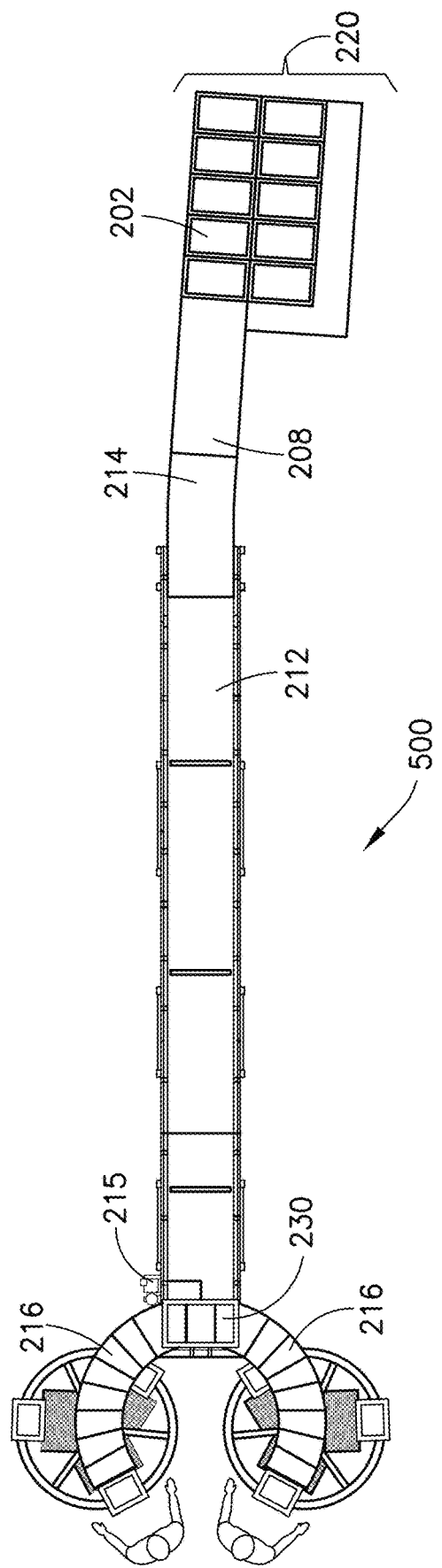
FIGS. 2A and 2B illustrate a top view and a side view, respectively, of an automated sortation system according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise", and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

Expressions of relational orientation, such as "upper," "lower," "inside," "outside," etc. which are used for explaining the structural positions of various components as described herein, are not absolute but relative. The orientation expressions are appropriate when the various components are arranged as shown in the figures, but should change accordingly when the positions of the various components in the figures change.

In this description, position terms such as "upper," "lower," "inside," and "outside" are defined according to the position of a ground pool during normal use.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

FIG. 1 is a flow chart of an automated sortation method according to an example embodiment. As shown in FIG. 1, various operations of an automated sortation method occur in an integration section 150, at which packages from another sorter are received and diverted to a smart bin/slide gate section 160. From the smart bin/slide gate section 160, packages are transferred to a package group collection and transportation section 170, then to a bag fill section 180, and then to a bag transportation and processing section 190. It should be noted that while the term "bag" is used in the descriptions of example embodiments, this term is not limiting, and any of the example embodiments described herein may be used in conjunction with any suitable container, including, but not limited to a bag.

According to the example embodiment shown in FIG. 1, packages enter a sorter in the integration section (S102), and are diverted from the sorter into a smart bin (S104), based on, for example an established sort criteria. In the smart bin/slide gate section 160, packages may continue to accumulate in the smart bin (S106). A determination of whether the smart bin is full (S108, S110) may be made based on a number of packages that have accumulated therein; based on a signal from an optical device, such as a photocell or other optical sensor, which detects a full condition; and/or based on one or more volumetric calculations based on known or sensed volumes of the packages. For example, there may be a smart-bin controller, and data on dimensions of each received package may be transmitted to the smart-bin controller, such that a total volume of packages can be calculated and tracked, and when a threshold volume is reached, the smart bin may be considered full and ready for release. Alternately, a photocell may be disposed at a fixed location on the smart bin or with respect to the smart bin, and when a signal from the photocell indicates that the photocell has been blocked for a predetermined period of time, it may be determined that the smart bin is full and ready to release.

According to another example implementation, when a smart bin is determined to be full, the system can be configured to release the packages onto the collector conveyor according to one or more of various criteria including, but not limited to: a leading edge of a tracking window being a certain distance (for example, 18 inches) past a configured offset of chute of a smart bin (this distance being configured to prevent packages from overflowing into a next zone when they are released); and a tracking window being is available and not assigned to another chute of another smart bin.

If it is determined that a smart bin is full (S110-YES), packages in the smart bin are transferred to a zoned collector conveyor (S112).

In an example implementation, the smart bin can include a gate, for example a high speed gate, at a bottom thereof, such that when the smart bin is full (S110) the gate opens, enabling packages to be vertically transferred, or dumped via a gravitational straight drop from the smart bin through the open gate onto the zoned collector conveyor disposed below the smart bin (S112). The zoned collector conveyor may comprise a plurality of dynamically established accumulation zones or windows.

Packages within an accumulation zone or window of a the zoned collector conveyor may be grouped and tracked together as they are transported as a group, for example down the collector conveyor (S114). The collector conveyor can be configured and positioned to feed onto, for example, a cleated conveyor with the cleats bounding each package group zone or window (S116). Packages from each package group zone or window can then be diverted or transferred for further processing as a group.

Upon a determination to deposit packages into a container fill chute (S118-YES), a package group can be diverted from the cleated conveyor into a hopper, and from the hopper, into a bag fill chute (S120). A bag can then be filled with the packages of the package group, and the package group is logically linked with the bag (S122). Upon a determination that a particular bag is full, or that the fill chute should not otherwise receive more packages (S118-NO), an additional incoming package group can be transferred to another collector conveyor in zones or windows within which the package group continues to be tracked (S140). The package group can then be diverted from such other one or more collector conveyors to another container fill chute (S138). A bag can then be filled with that package group and logically linked with the bag (S122).

After a bag is filled with a package group, and the package group is logically linked with the bag, the bag can be transported to a processing area (S124) where the bag is closed (S126). For example a bag can be zipped closed, and a shipping label can be applied to the bag (S128). Of course, zipping a bag closed is only one example, and the bag or other container can be closed in any of various other ways. A labeled bag containing the package group, can then be transferred for further processing (S130). Additionally, the package group associated with the bag may be cleared, i.e. the package group and bag may be disassociated from a container, for example automatically or via a container release button, and the empty container can be returned (S132), for example to a racetrack, and reloaded with one or more bags, for example to wait in a queue to be filled (S134), and transported to queue area at container fill chute for processing (S122) of another package group.

Figure 2B:
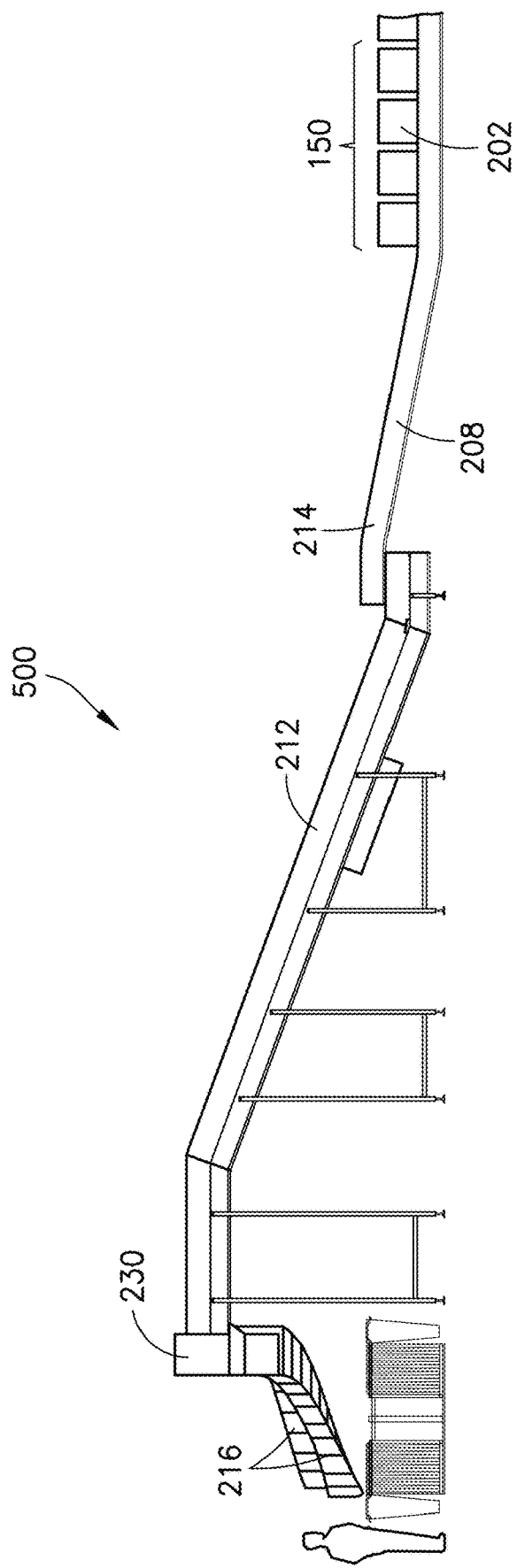

FIGS. 2A and 2B illustrate a top view and a side view, respectively, of an automated sortation system 500 according to an example embodiment. As described herein, a bin according to one or more example embodiments may be referred to, for ease of explanation and without any limitation, as a "smart bin.". Such a smart bin 202 can be configured to feed a collector conveyor 208, for example located under each side of the sorter 220, for example a sorter having sections. The smart bins 202 may be positioned within the integration section 150 to receive packages from the sorter 220 and to selectively release one or more packages (not shown) onto the collector conveyor 208. As discussed above with respect to FIG. 1, the packages may be released based on any of various criteria and/or a signal from a sensor, such as an optical sensor.

The released packages form a package group, released for example directly below a chute of smart bin 202 onto the collector conveyor 208. Each package group can then be logically tracked down the collector conveyor 208 in zones or windows of suitable dimensions. For example, a zone or window may be a section of the collector conveyor 208 having a width of the collector conveyor 208 and extending about 10 ft in length. The specific configurations of each of a smart bin 202 and a collector conveyor 208 can be optimized for efficiency and accuracy of package processing. This includes, without limitation, parameters such as, but not limited to, size, relative positions (vertically and/or horizontally) with respect to each other, and relative displacement (for example due to speed and/or direction of the conveyor 208). For example, for an essentially vertical drop of packages (e.g., due to gravity) from a smart bin 202 onto a conveyor 208, a spread of packages on the collector conveyor 208 and, for example, a the size or dimensions of a zone or window, can be optimized by taking into account one or more of the height or distance from the chute of the smart bin 202 to surface of the collector conveyor 208, the relative moving speed of the surface of the collector conveyor 208 with respect to the smart bin 202, and the relative moving direction of the surface of the collector conveyor 208 with respect to the smart bin 202. In addition, a speed of opening and/or a type of opening (such sliding, hinged, etc.) of a chute or opening of the smart bin 202 can be selectively implemented to facilitate deposition of packages onto the collector conveyor 208. For example, a system can comprise a belt running at 150 fpm, and for such belt speed, a 10 foot windows can be defined in accordance with an example implementation. One or more of a texture, a material, a resilience, and a roughness of the surface or portions of the surface of the collector conveyor 208 can be selected to facilitate the deposition of packages on the collector conveyor 208 and/or the maintenance of packages on the collector conveyor 208. Any combination of any or all of the above-noted parameters, features, and structures can be selectively adjusted and/or optimized to facilitate group tracking and/or processing of packages in accordance with one or more example embodiments described herein.

According to further example implementations, zones or windows can be created or defined on the collector conveyor 208 and/or the cleated conveyor 212 using an encoder pulse width from an optional encoder 215, such that when a certain selected or predetermined number of pulses of the encoder are detected that correspond to a determine window size, a unique token may be created. The unique token can be tracked along the collector conveyor 208 and/or the cleated conveyor 212 using the encoder pulse. This sequence can be repeated for each zone or window. When a package group is released from a smart bin into a zone or window, a smart bin number of the smart bin can be associated with the unique token. When the window reaches the charge of the hopper 230, the system will drop the load into the available hopper 230. At this point the smart bin number is passed to the host system to initiate the printing of a label to be associated with that group of packages.

As shown in FIGS. 2A and 2B, this example system 500 comprises the collector conveyor 208 which transfers packages to a conveyor 212. The collector conveyor 208 may include a rising section 214 in which the collector conveyor 208 is at an inclined angle, with an upper end adjacent to a conveyor 212. The conveyor 212 may be a cleated conveyor, and cleats may form boundaries for one or more zones or windows along the conveyor 212.

From the conveyor 212, package groups can be fed into one of one or more chutes 216 for filling into a respective closable bag 218. Each package group ID may be logically linked to the corresponding bag 218, and a label may be printed and placed on the bag 218. The example system 500 may also include a diverting hopper 230 which receives packages from the conveyor 212 and diverts the packages into a chute 216.

Regarding the cleated conveyor 212, according to an example implementation, a speed of the cleated conveyor can be dynamically adjusted so that tracking zones or windows (for example, ten-foot windows) align with the physical cleat spacing. Such dynamic adjustment can be accomplished using a sensor to detect each cleat and using an encoder.

Figure 3A:
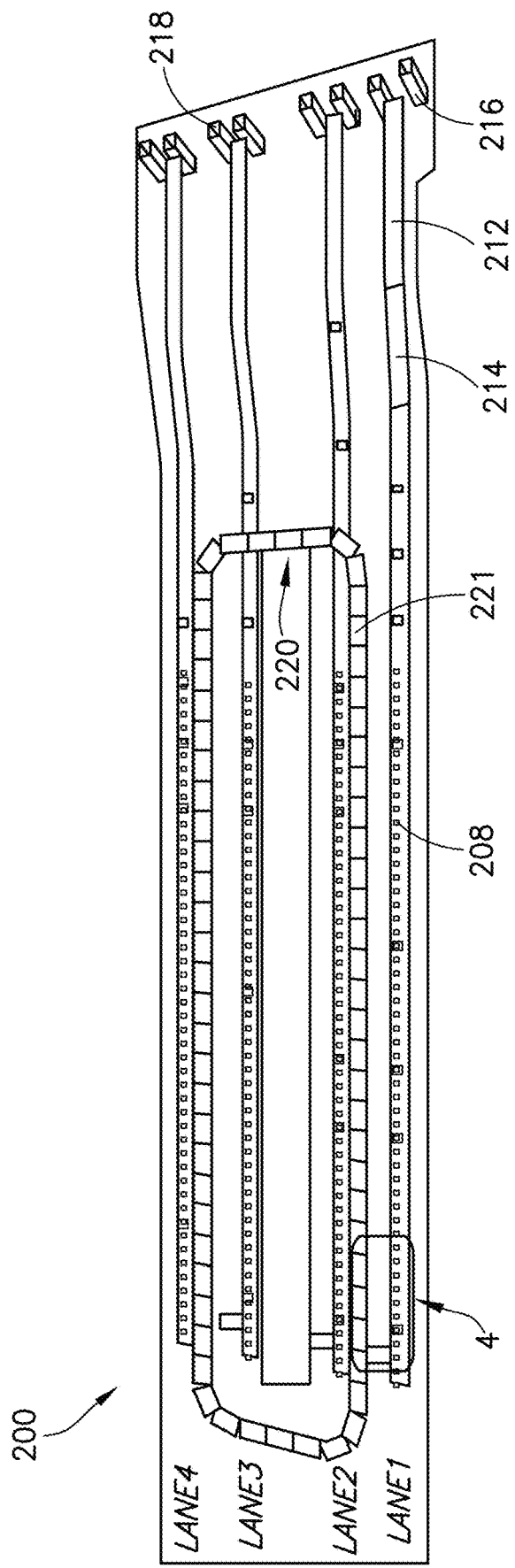
FIG. 3A is a perspective view of an automated sortation system according to an example embodiment.
Figure 3B:
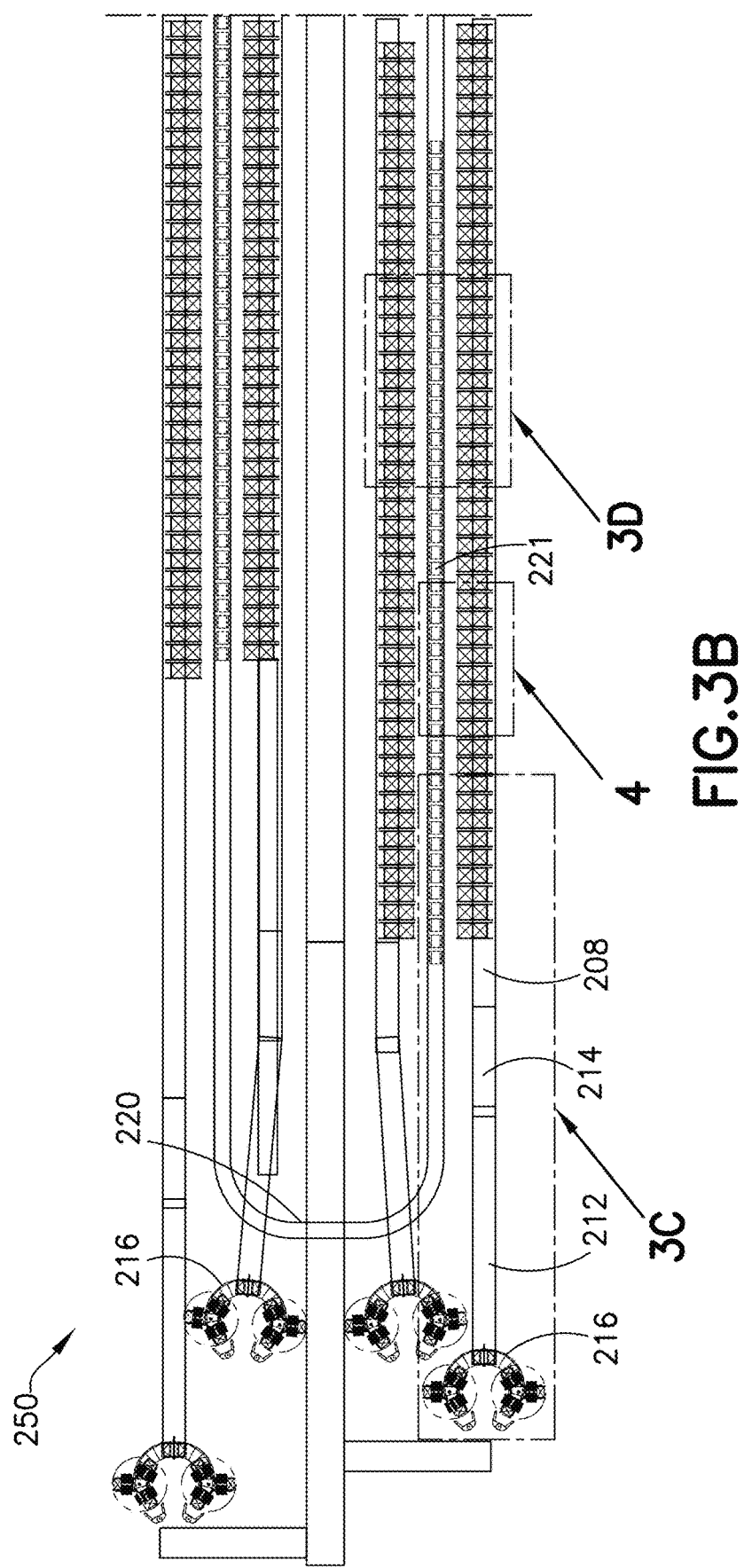
FIG. 3B is a schematic illustration of an automated sortation system according to an example embodiment.
Figure 3C:
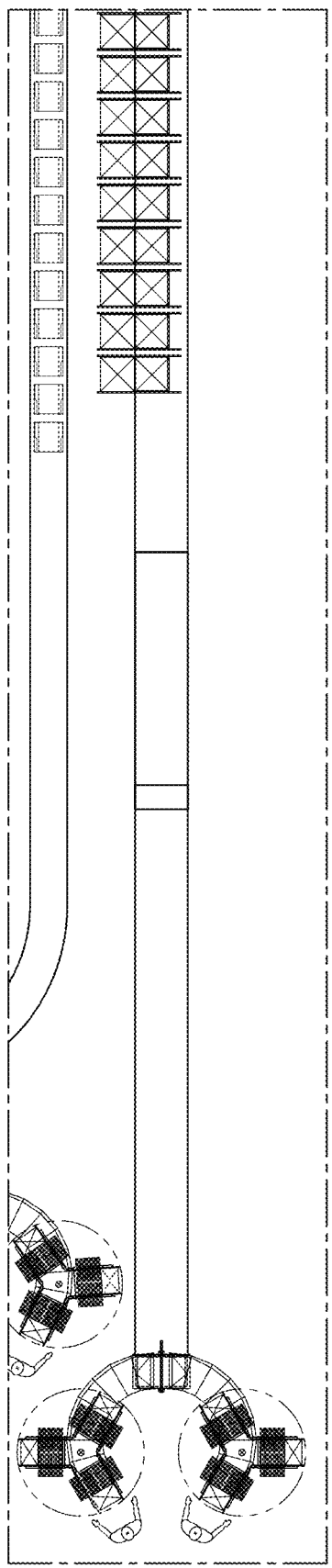
FIG. 3C shows an enlarged view of a section of FIG. 3B, according to an example embodiment.
Figure 3D:
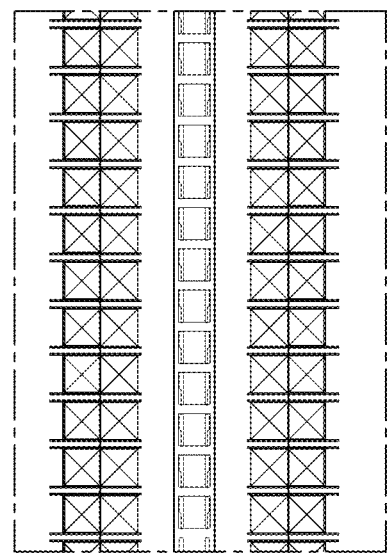
FIG. 3D shows an enlarged view of another section of FIG. 3B, according to an example embodiment.
Figure 4:
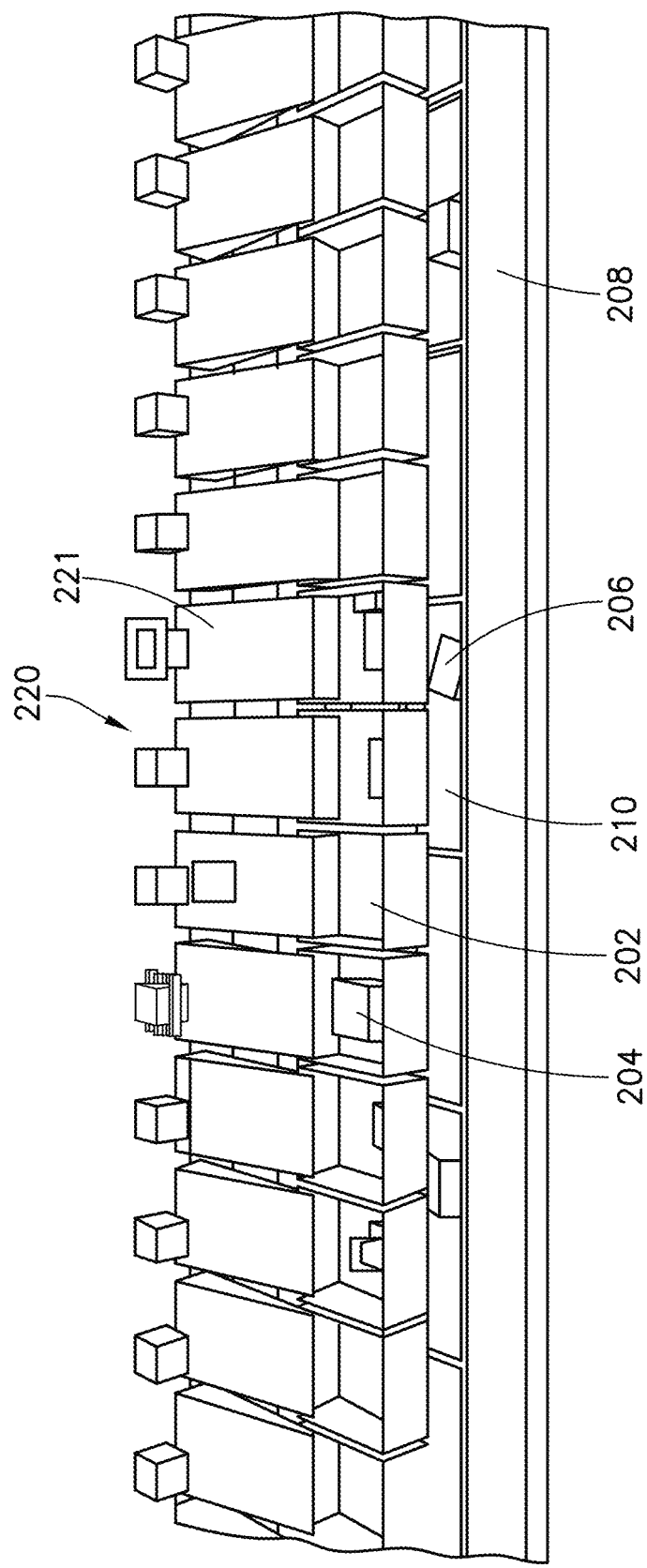
FIG. 4 is an enlarged perspective view of a section of FIGS. 3A and FIG. 3B, according to an example embodiment.

FIG. 3A is a perspective view of an automated sortation system 200 according to another example embodiment. FIG. 3B is a schematic illustration of an automated sortation system 250 according to yet another example embodiment. FIGS. 3C and 3D are enlarged top and side views of sections B and C of FIG. 3B. FIG. 4 is an enlarged perspective view of section A of FIG. 3A and FIG. 3B. References numbers used in FIGS. 3A, 3B, and 4 are the same as those used with respect to FIGS. 2A and 2B, with respect to illustration of analogous elements. In contrast to the example embodiment of FIGS. 2A and 2B, FIGS. 3A, 3B, and 4 illustrate example sections 221 of the sorter 220, and illustrate example packages 206 within the systems 200 and 250.

Figure 5A:
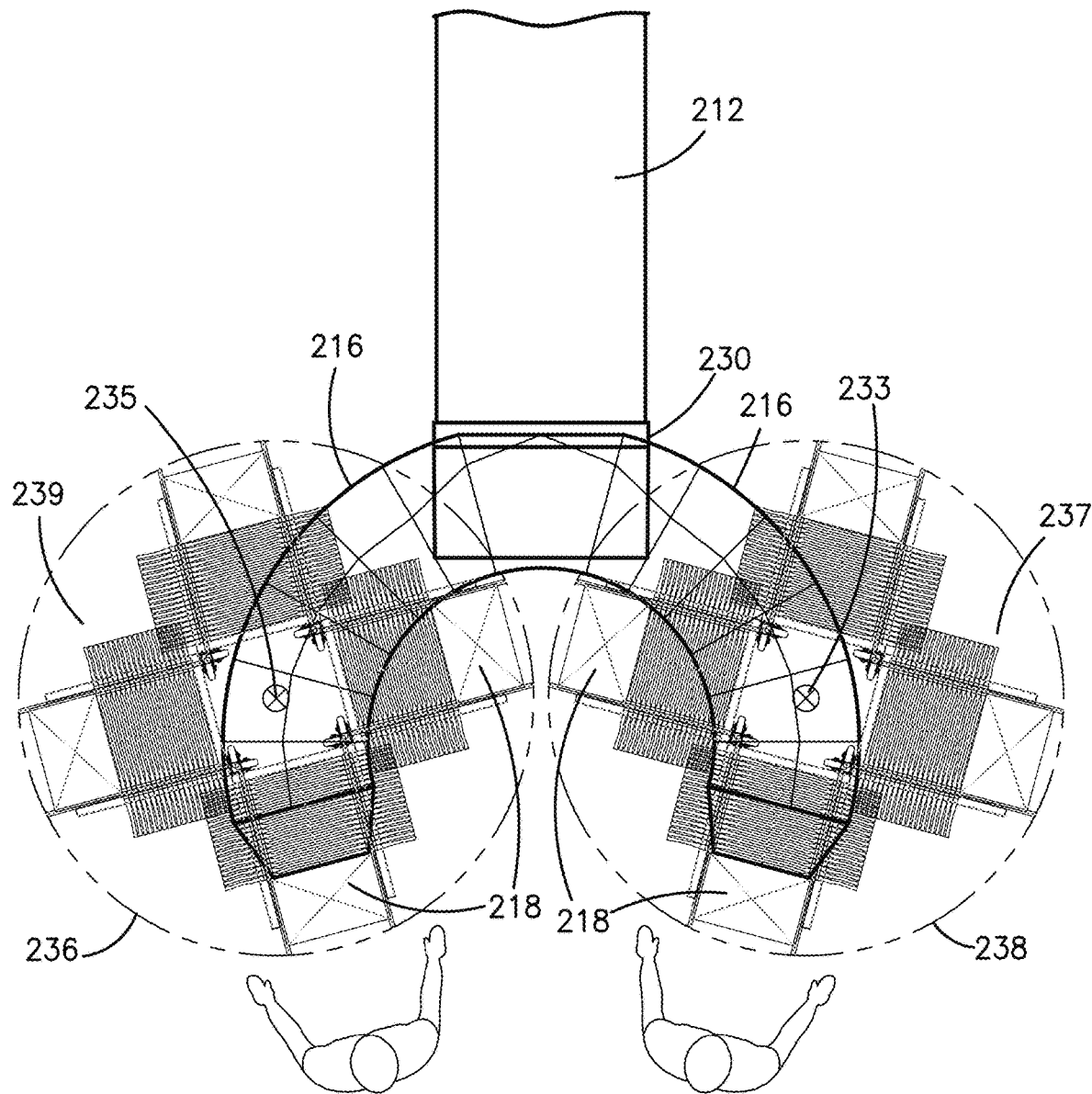
FIGS. 5A-5C are illustrate an enlarged schematic view, a side view, and a back view, respectively, of an end of a cleated conveyor, a hopper, and chutes of a system according to an example embodiment.
Figure 5B:
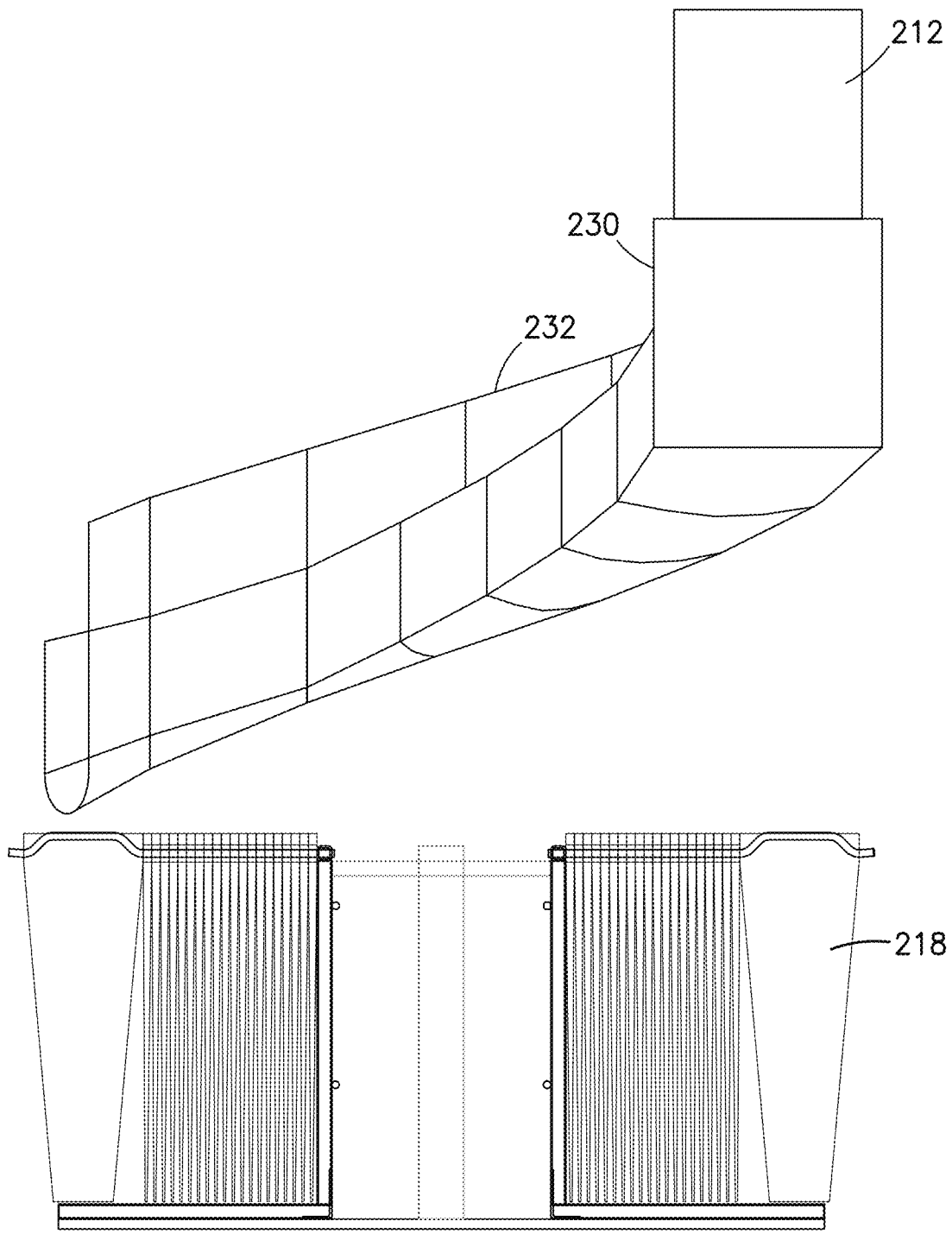
Figure 5C:
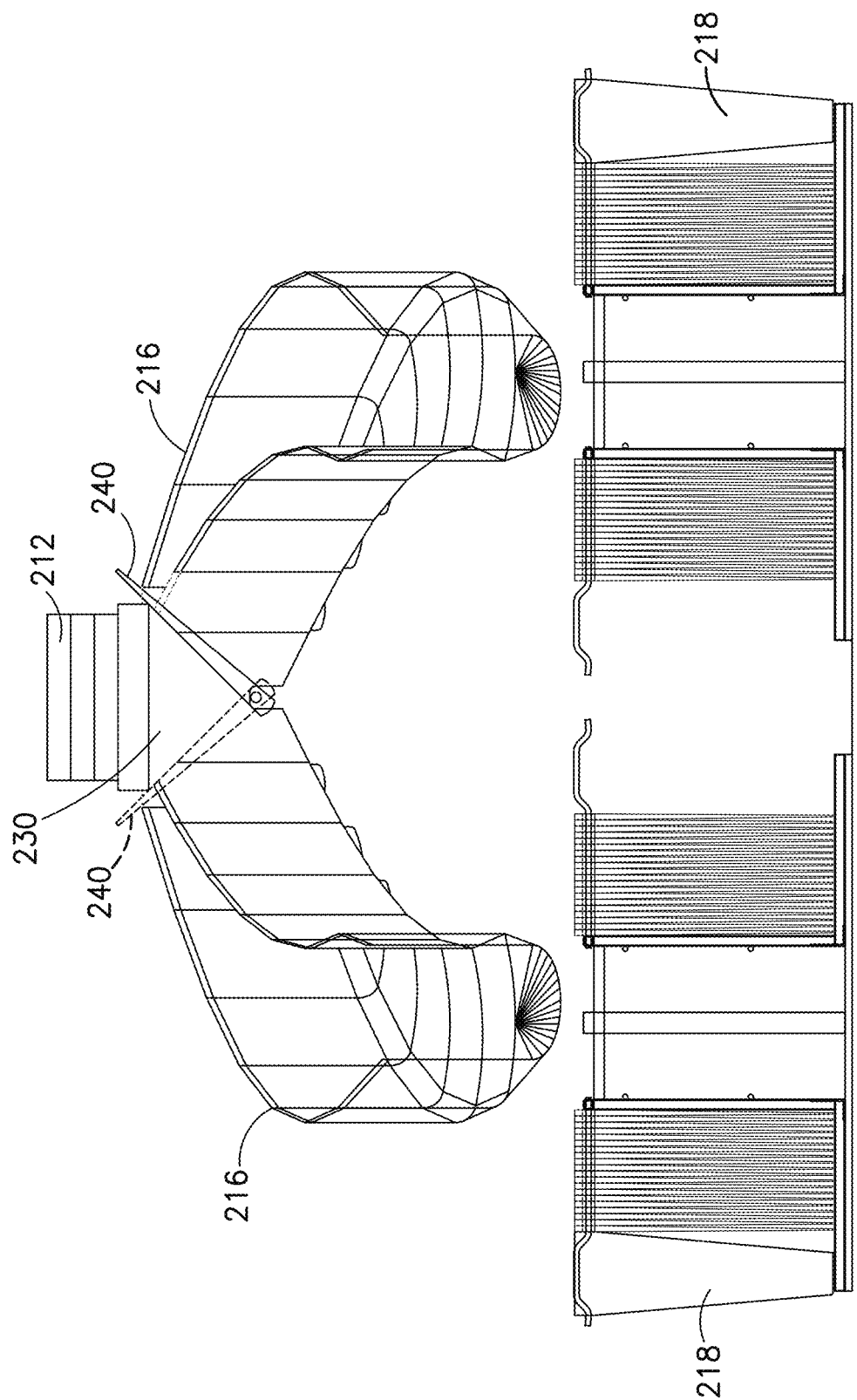
Figure 5D:
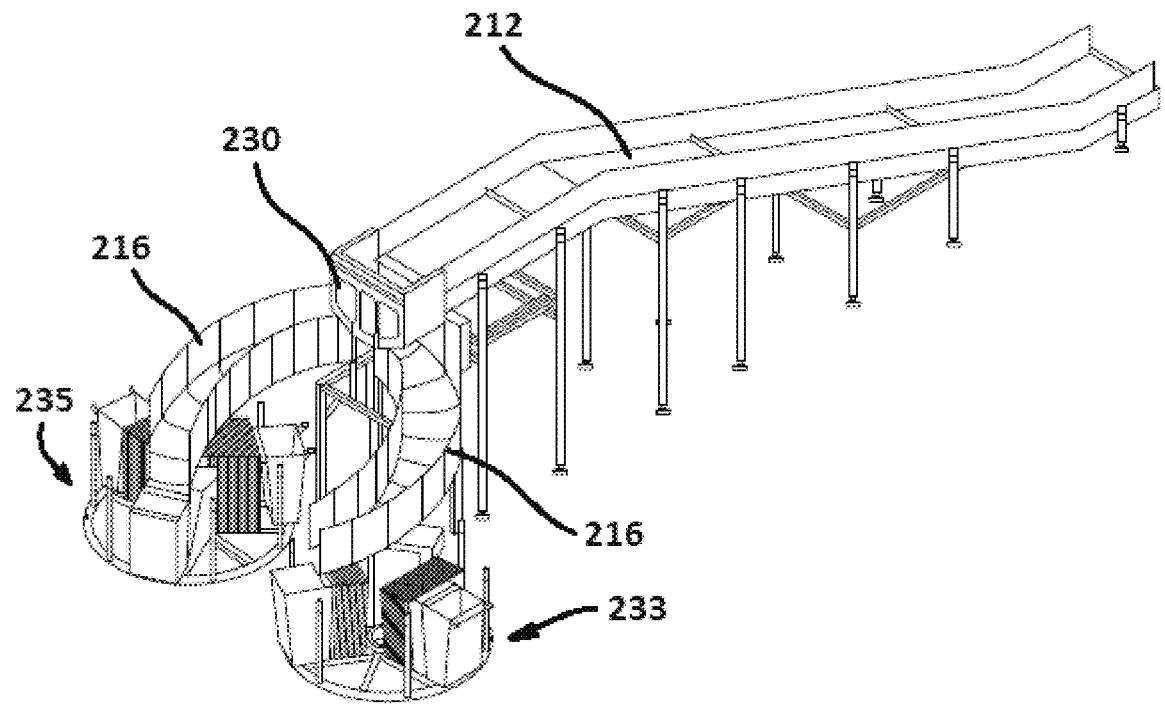
FIGS. 5D-5G are a perspective view, a top view, an end view, and a side view, respectively, of a cleated conveyor, a hopper, chutes, and carousels of a system according to an example embodiment.
Figure 5E:
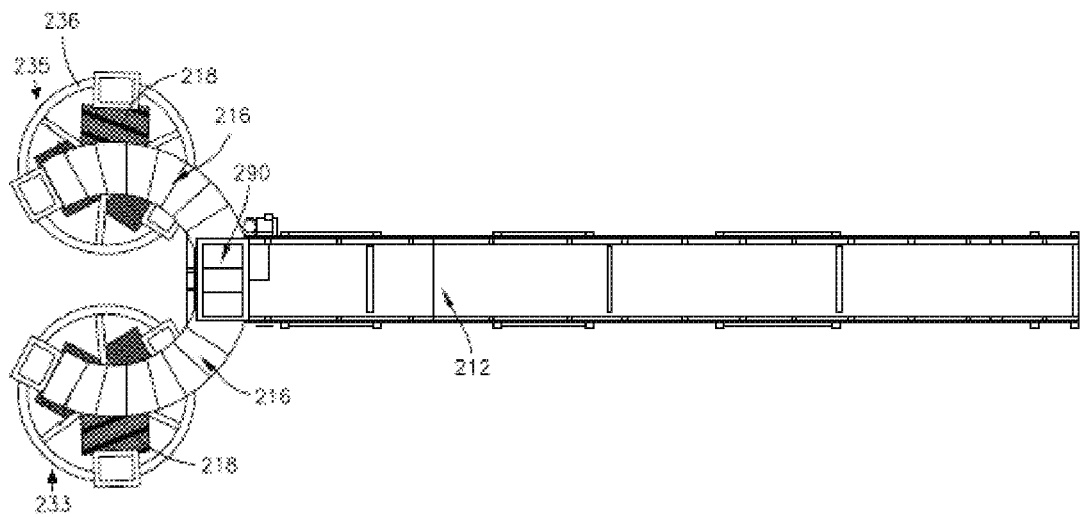
Figure 5F:
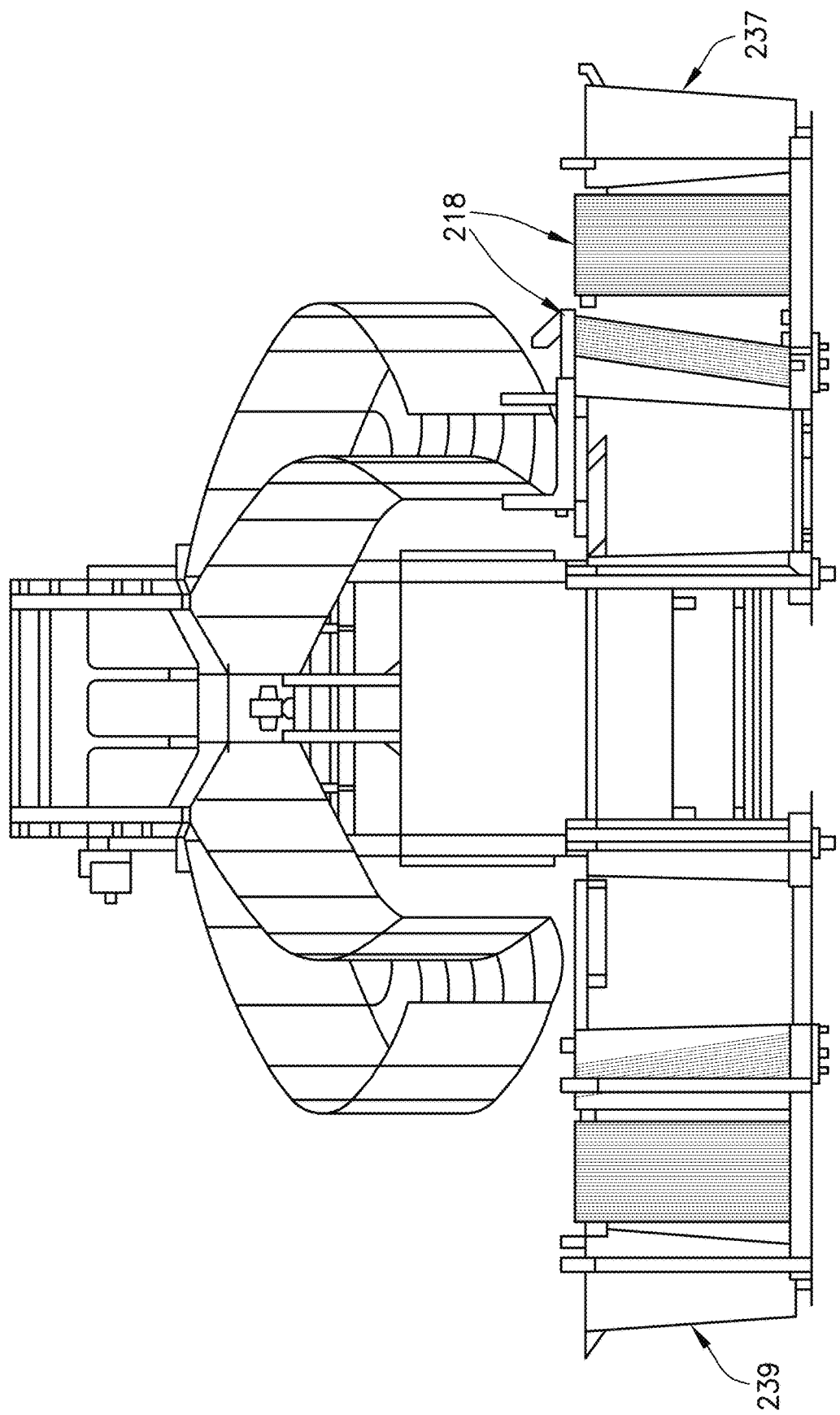
Figure 5G:
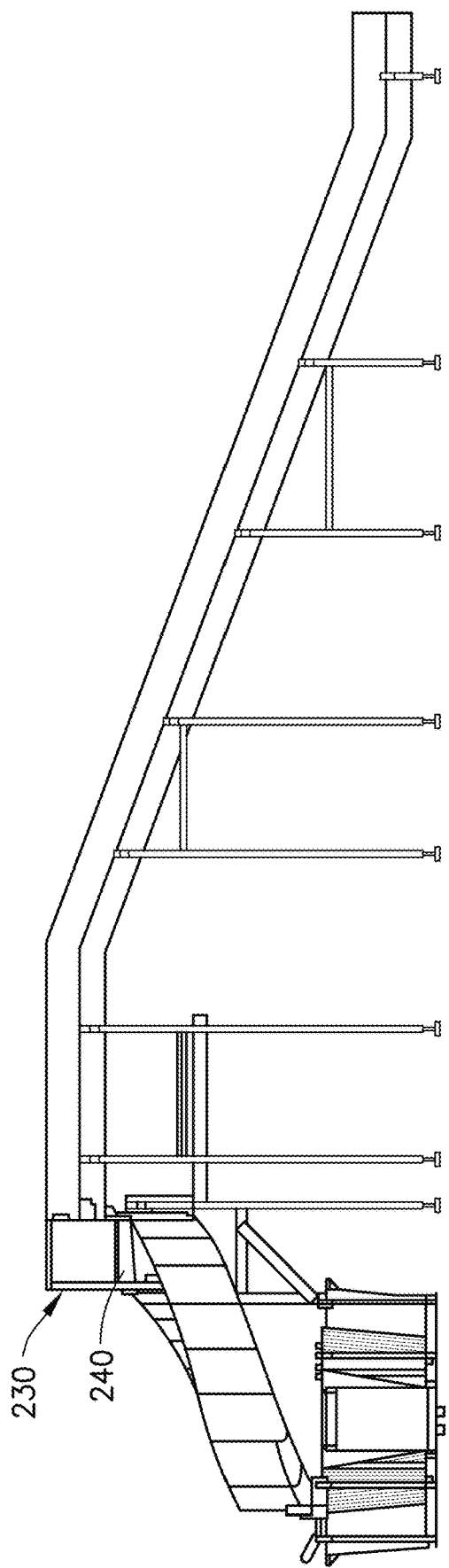
Figure 5H:
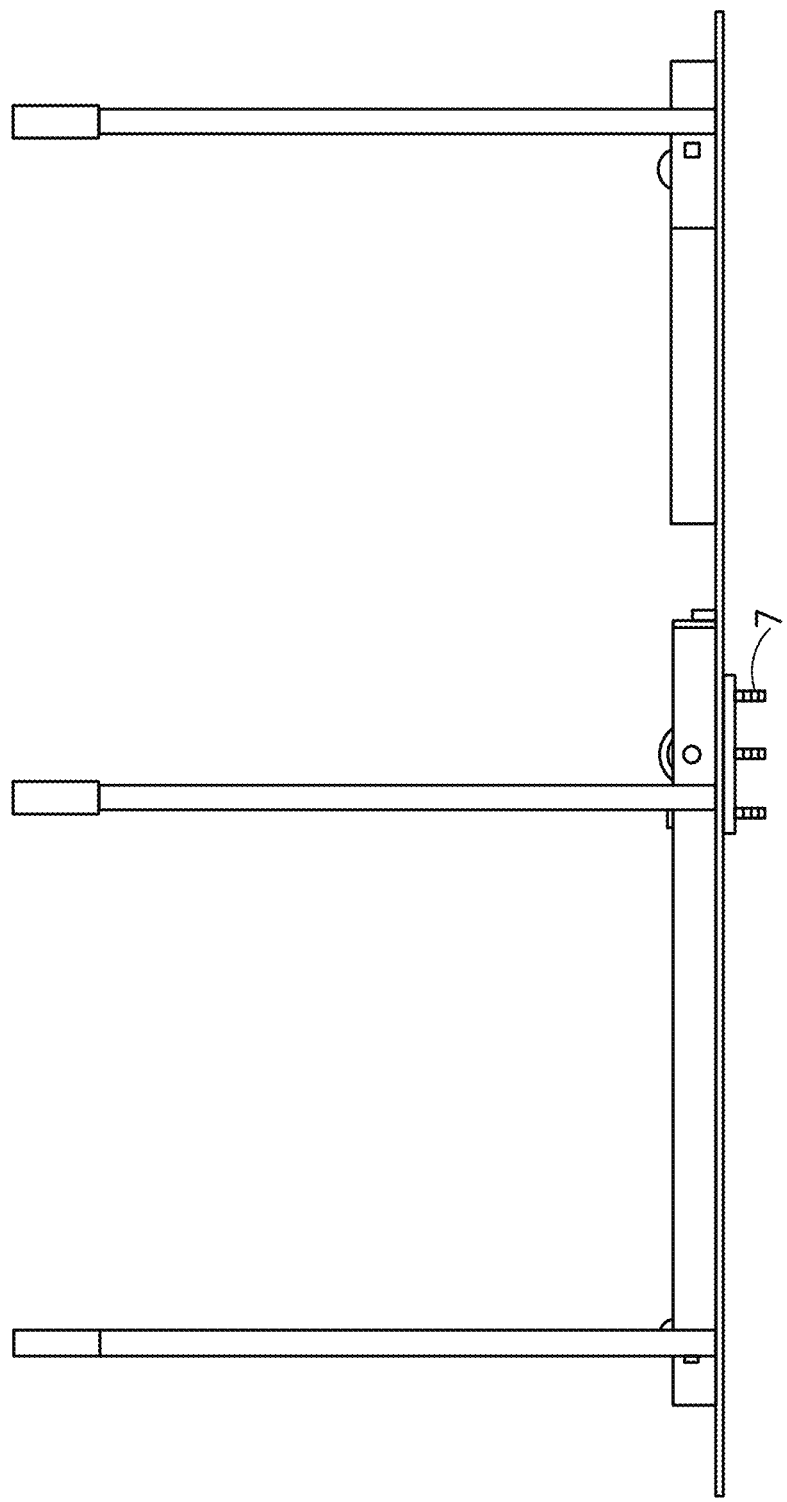
Figure 51:
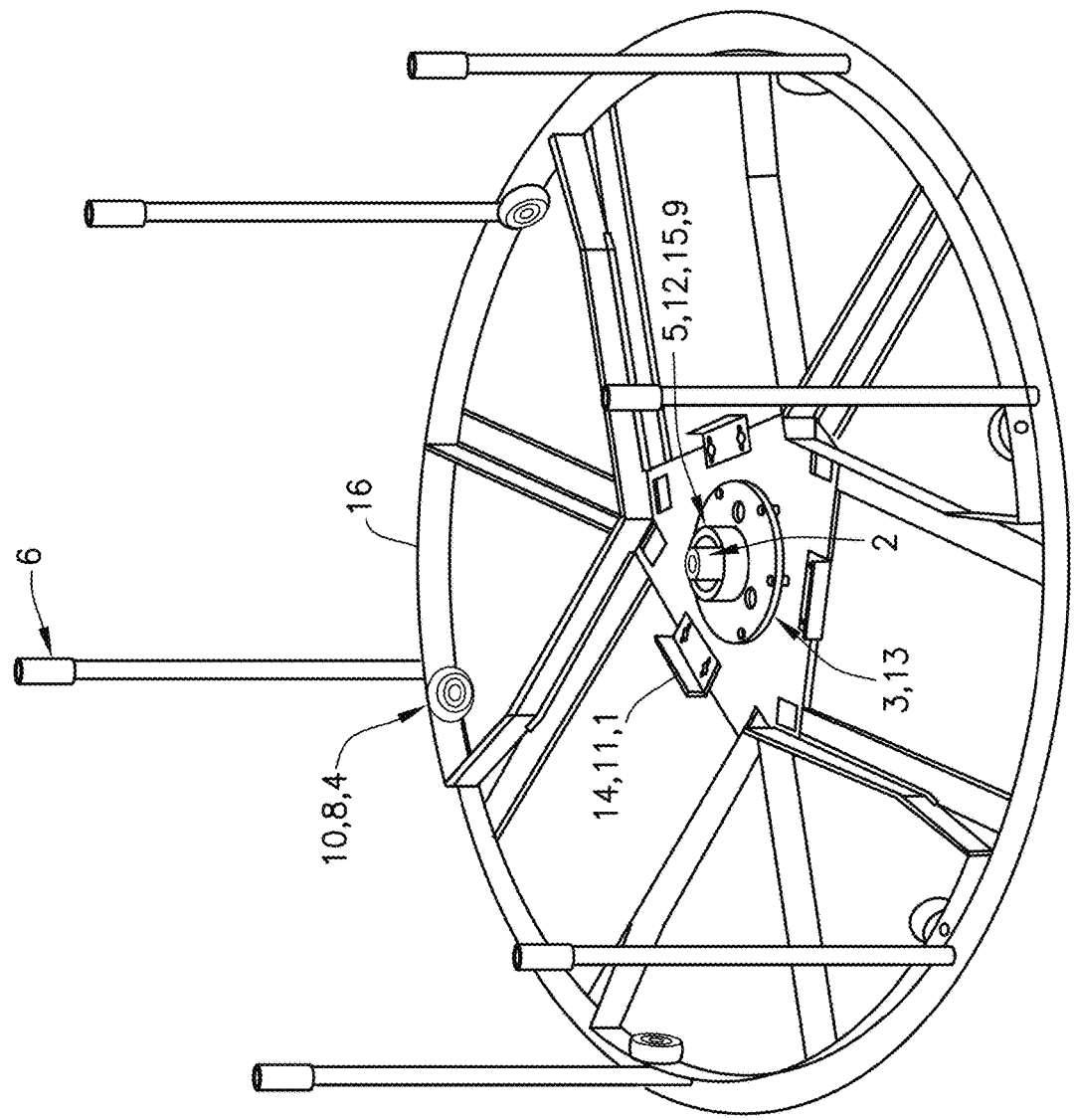
Figure 5J:
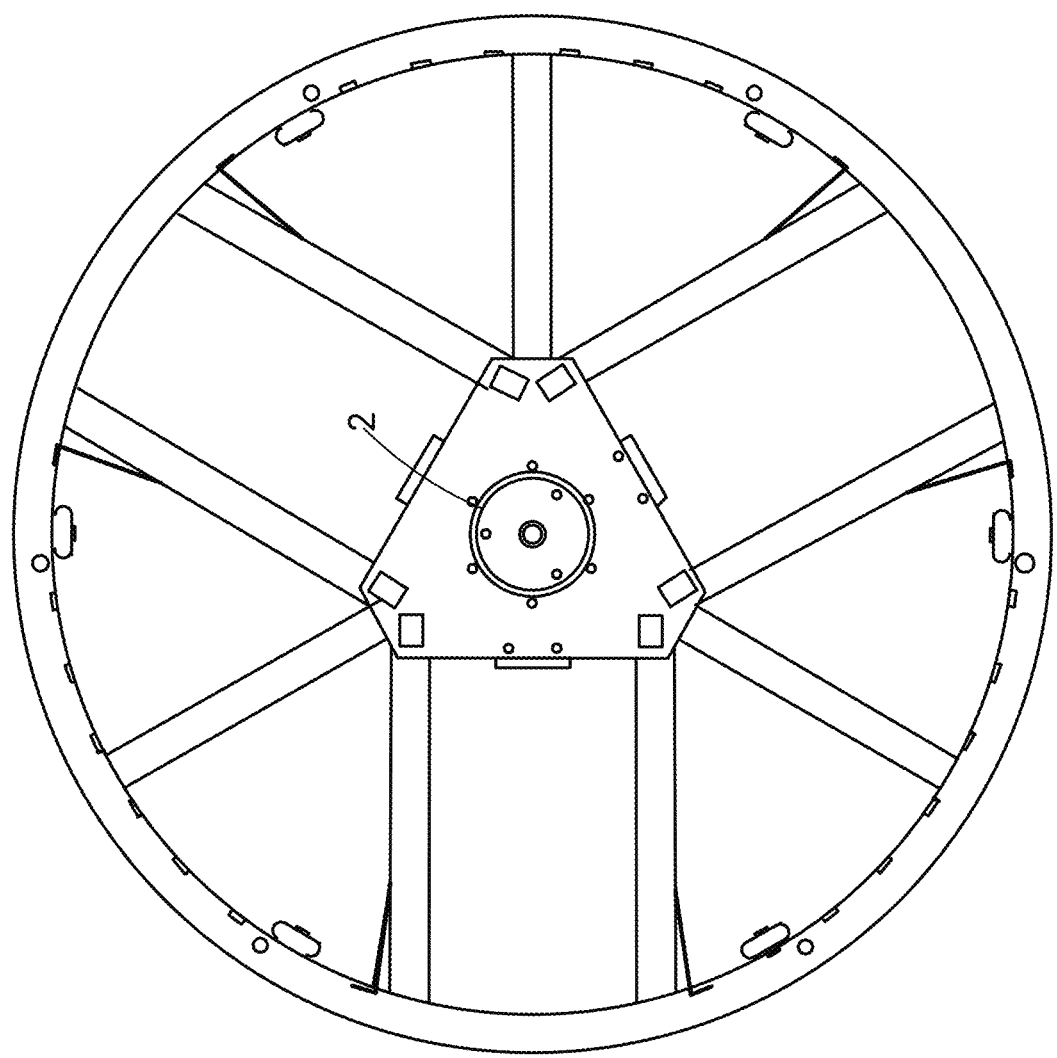

FIGS. 5A-5C illustrate an enlarged schematic view, a side view, and a back view, respectively, of an end of the cleated conveyor 212, the hopper 230, and the chutes 216 of an example system 500, 200, or 250. FIGS. 5D-5G are a perspective view, a top view, an end view, and a side view, respectively, of the cleated conveyor 212, the hopper 230, the chutes 216, and carousels of an example system 500, 200, or 250. As shown, the hopper 230 may be a diverting hopper 230 configured to receive packages from the conveyor 212 and direct the packages of each package group into one of the two chutes 216. FIGS. 5H-5J are a side view, a perspective view, and a bottom view of an example carousel configuration. An example carousel is shown in FIGS. 5H-5J in which, for example: 1 is a formed angle stop; 2 is a center foot weldment; 3 is a flange bearing mount plate; 4 is a 4" easy turn caster; 5 is a two bolt flange bearing for 2" shaft diameter; 6 is a grip for 1-3/8" OD; 7 is a 3/8" anchor bolt; 8 is a steel hex head shoulder screw, ½" shoulder diameter, 1-3/4" shoulder length, 3/8"-16 thread; 9 is a thin hex nut, nylon insert, 5/8"-11; 10 is a medium-strength steel nylon-insert locknut, grade 5, zinc-plated, 3/8"-16 thread size; 11 is a hexagon socket button head cap screw ¼"-20×1/2" LG; 12 is a hexagon socket head cap screw 5/8"-11×1.75" LG; 13 is a hexagon socket button head cap screw 5/16"-18×½" LG; 14 is a ¼ plain washer (inch) type A and B; 15 is a 5/8" plain washer (inch) type A and B; and 16 is a carousel weldment.

The diverting hopper 230 may comprise one or more flip gates 240 which selectively block or permit a package to flow into one of the chutes 216. Alternately, the diverting hopper 230 may comprise air-operated, rodless cylinders mounted at 90° with respect to each other and at 45° with respect to a floor, such that the cylinders can be selectively retracted or extended to open and close a flip gate 240 which selectively blocks or permits a package to be diverted into one of the chutes 216. Chutes 216 can be configured to deposit packages of a single package group into an open bag 218, such that an operator may then close the bag, apply a label, remove the bag, and open a subsequent bag.

According to an example aspect, closable bags can be arranged at each of the chutes 216 in merry-go-round configurations 236 and 238, such that, at each of the merry-go-round configurations 236 and 238, a bag 218 can be staged on each one of a plurality of carts, for example four carts, such as carts 237 or 239, below a respective chute 216. The bags 218 can be mounted on a carousel 233, 235 which can be rotated to present a staged empty bag, as needed. Alternately, a linear shuttling system may be used in which shuttling carts with empty bags are moved from left to right, or a single cart can be in position and replaced once empty bags are all used. Once filled, a closable bag 218 can be labeled, closed, and placed onto a return conveyor to go back into the parcel sorting system.

Figure 6B:
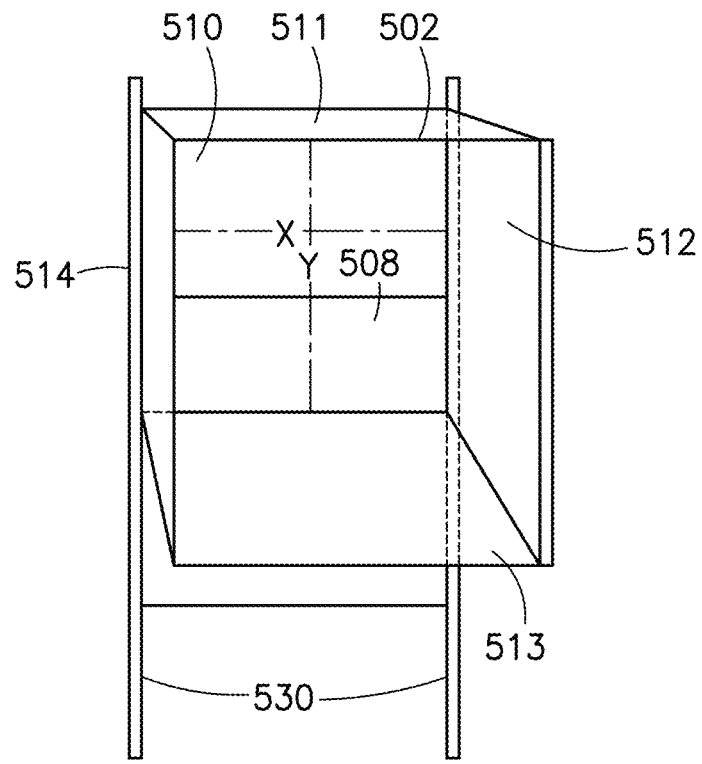
Figure 6C:
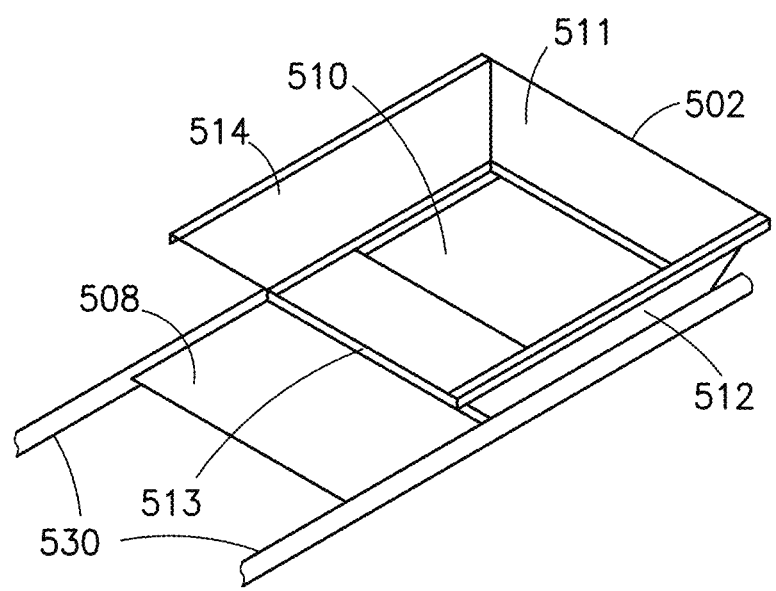
Figure 6D:
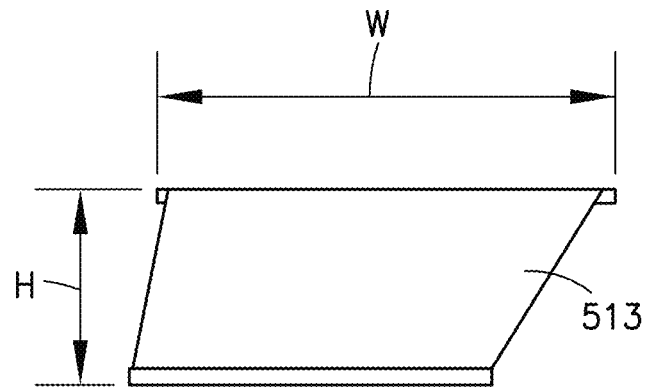
FIG. 6D is a plan view of the front of a smart bin according to an example embodiment.
Figure 6E:
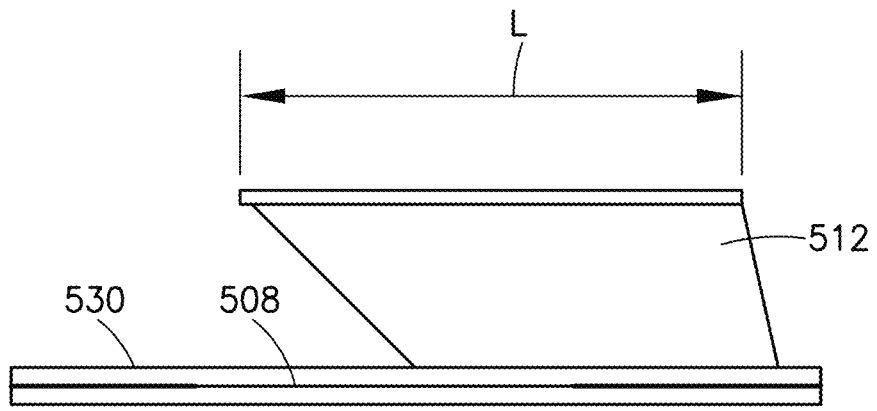
FIG. 6E is a plan view of a side of the smart bin according to an example embodiment.
Figure 7A:
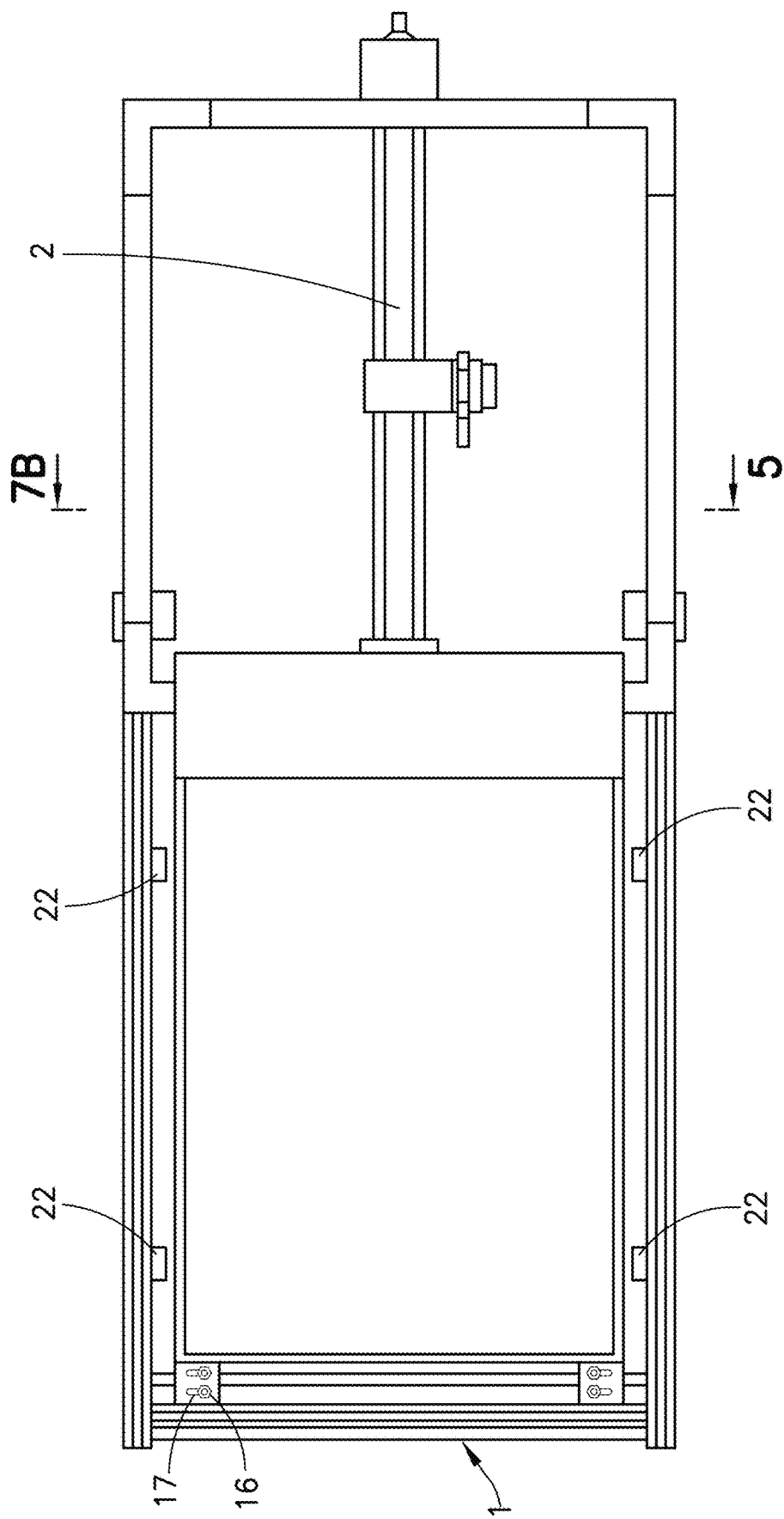
FIGS. 7A, 7B, 7C, 7D, 7E, and 7F show different views of an example smart bin according to another example embodiment.
Figure 7B:
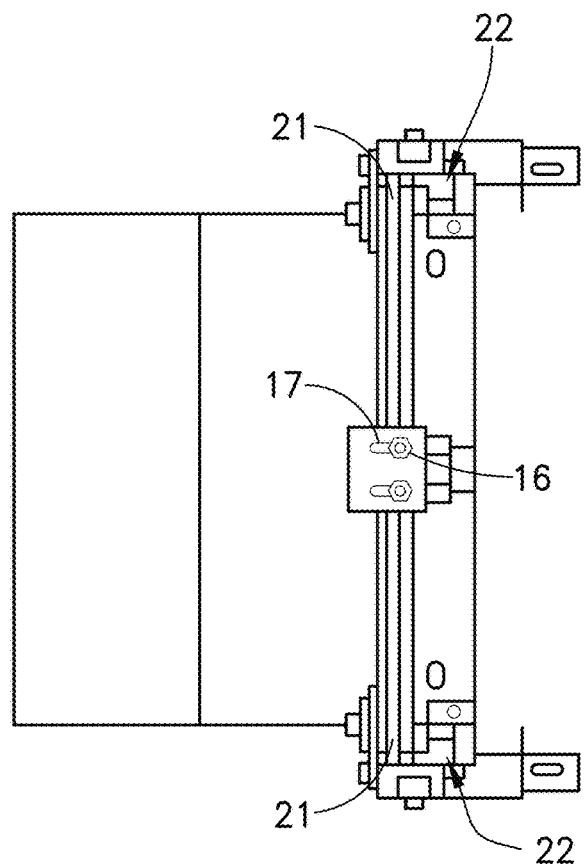
Figure 7C:
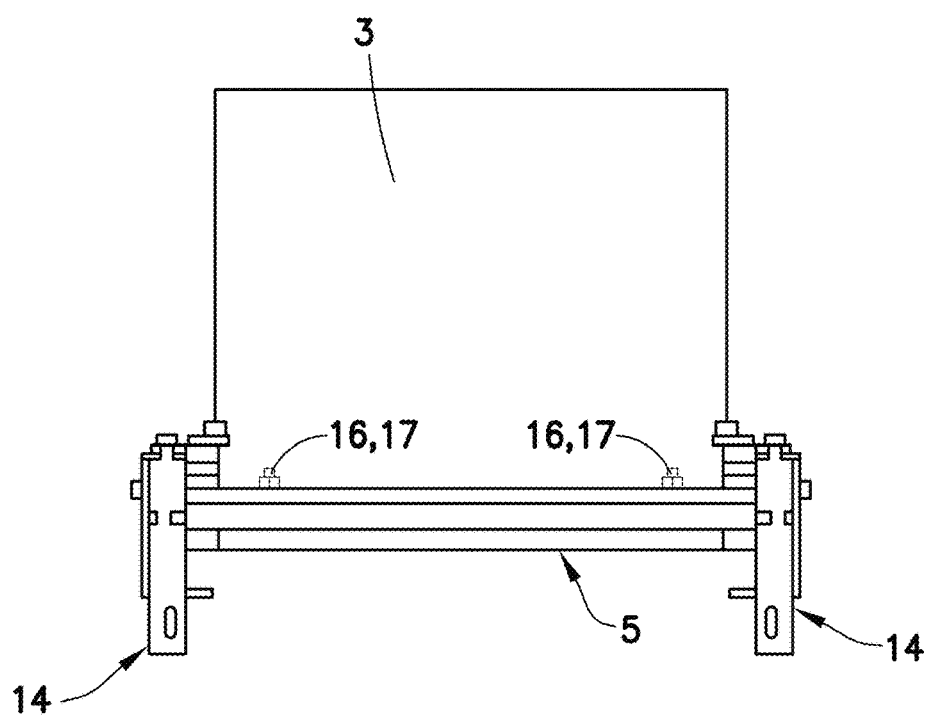
Figure 7D:
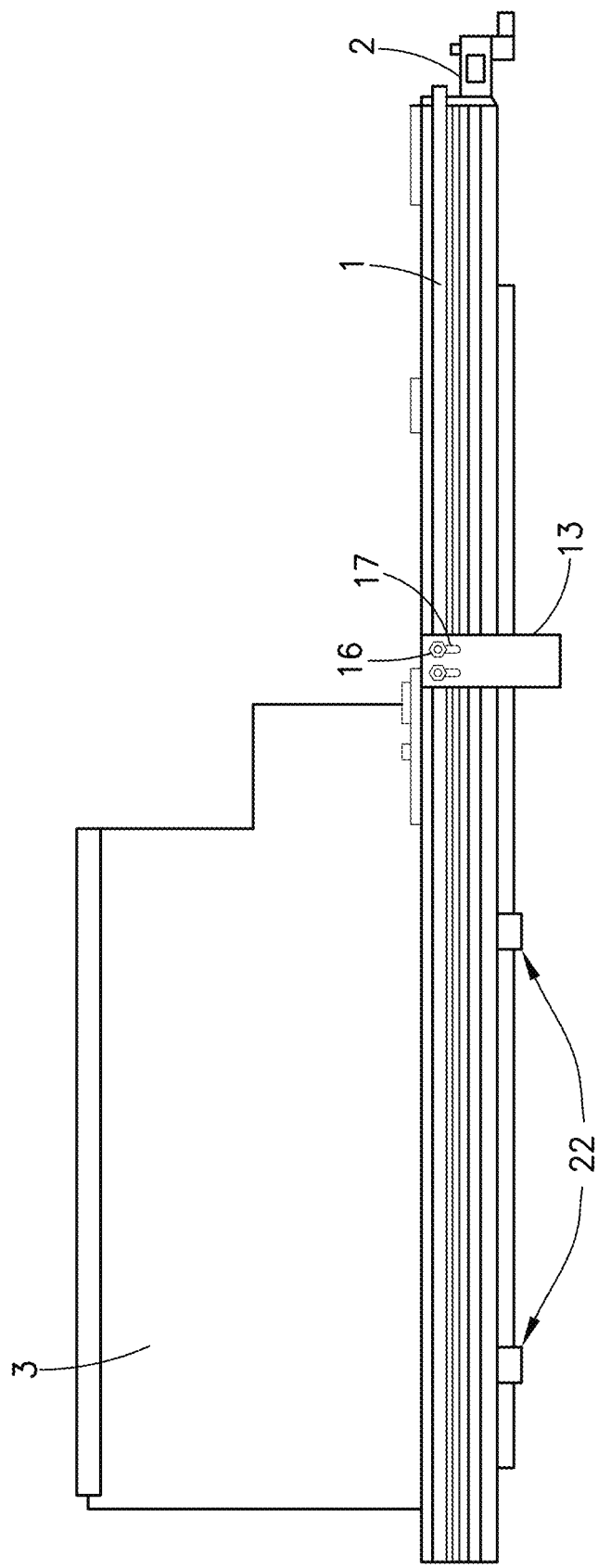
Figure 7E:
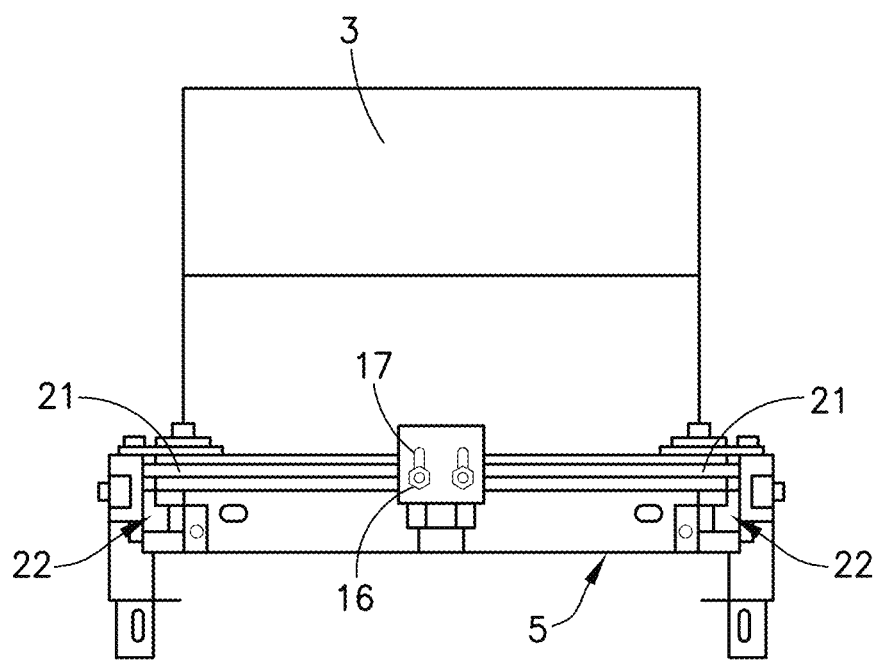
Figure 7F:
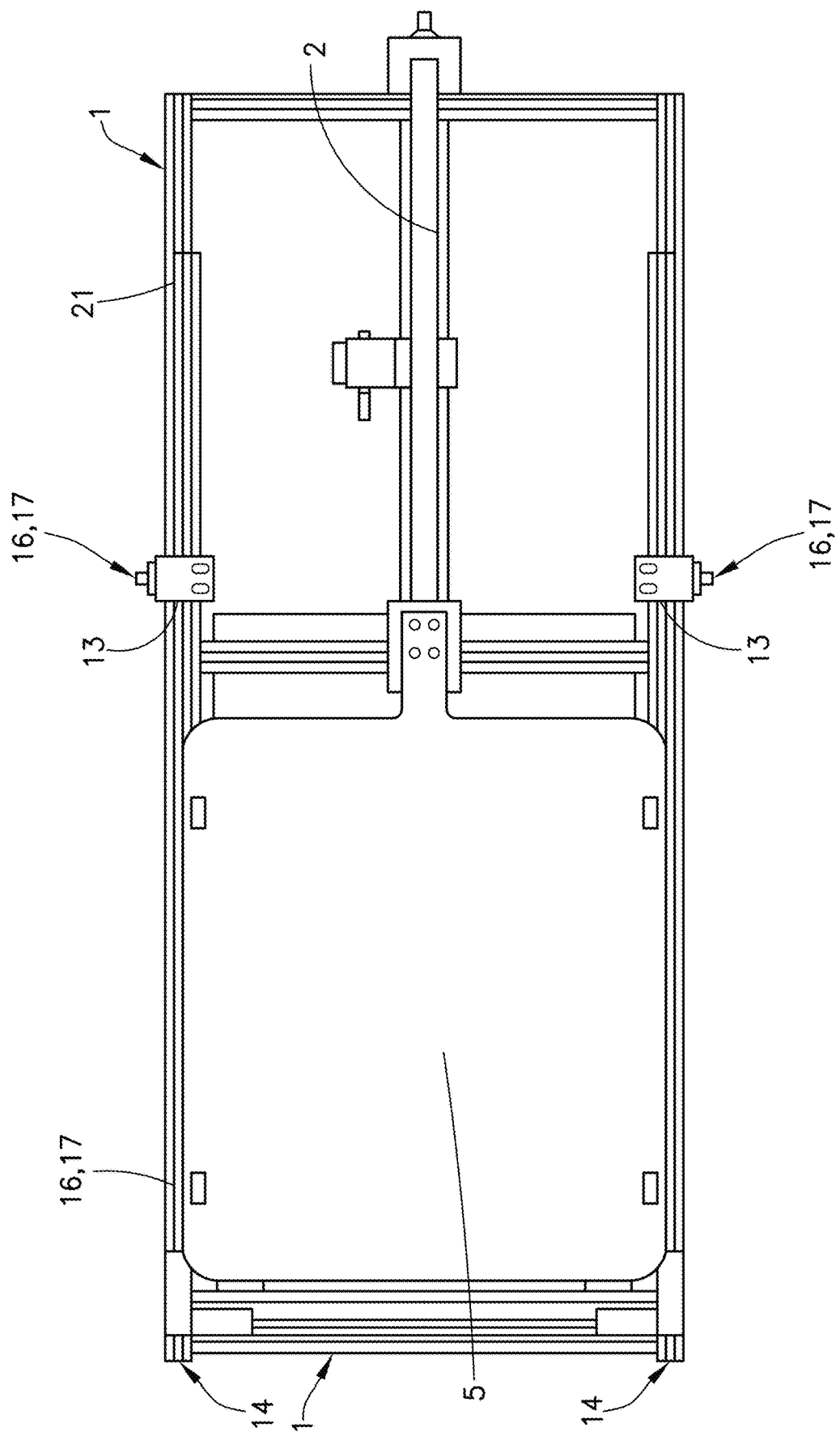

FIGS. 6A-6E illustrate a smart bin 202, according to an example embodiment: FIGS. 6A, 5B, and 6C are different perspective views of the smart bin; FIG. 6D is a plan view of the front of the smart bin; and FIG. 6E is a plan view of a side of the smart bin. As shown in FIGS. 6A-6E, the smart bin 202 includes a bottom 504, and a side wall 502 extending upward from each edge of the bottom 504, such that the bottom 504 and side wall 502 together define a cavity 506, therewithin. The cavity 506 can have any of a variety of dimensions, including cross-section X-Y, height H, width W, and length L, sufficient to accommodate a plurality of packages 204 that can be transferred or released to zones or windows 210 of collector conveyor 208. The bottom 504 comprises a gate 508, which is moveable between an open position and a closed position. When the In the gate 508 is in the open position, a passage 510 is defined by lower edges of the side wall 502, and a rear edge of the bottom 504/gate 508, as shown in FIGS. 5B and 6C. The passage 510, thus open, enables packages 204 to be released from the cavity 506, for example onto a collector conveyor 208. The side wall 502 may comprise four adjoining sections 511, 512, 513, and 514, which together to define sides of the cavity 504 having an essentially rectangular bottom with a cross-section X-Y. One or more of the sections 511, 512, 513, and 514 may slant outward from their respective bottom edges, such that one or more of the sections 511, 512, 513, and 514 may have a rectangular shape or a trapezoidal shape. The cavity 504 may have a height H, a width W, and a length L, as shown in FIGS. 6D and 6E. The gate 508 can be a slide gate having a linear guide system 530 and a linear actuator 520. The guide system 530 may include two or more guide rails, as shown in FIGS. 6A, 6B, 6C, and 6E. Further components may be included in the smart bin 202, such as a strip bush holder 522, a strip bush 524, and a pillow block 526, which may facilitate operation of the smart bin 202.

According to example implementations, Ultra High Molecular Weight Polyethylene (UHMW), or other types of low-friction material, can be used for manufacturing and/or for lining of chutes, hoppers, bins and other wear surfaces.

FIG. 7 illustrates another example smart bin 602 according to an example implementation in which: 1 is a frame assembly; 2 is a cylinder assembly; 3 is a smart bin assembly; 4 is a frame connector plate; 5 is a slide gate; 6 is a smart bin-right; 7 is a smart bin-left; 8 is a smart bin-sorter side; 9 is a smart bin-operator side; 10 is a smart bin-belt retainer plate; 11 is a smart bin-belt wiper; 12 is a smart bin-belt return plate with weldnuts; 13 is a slide gate mounting angle; 14 is a slide gate end mount plate; 15 is a smart bin-UHMW wiper; 16 is a t-bolts for extrusion slots; 17 is a t-bolt lock nuts for extrusion slots; 18 is a side rails estruction ×69.5 lg (1×3 slots); 19 is an intermediate strut extrusion ×25.375 lg (1×1 slots); 20 is an intermediate struts extrusion ×25.375 lg (1×3 slots); 21 is a bearing rail igus size 16 rail ×1346 mm lg; and 22 is a bearing igus drylin with bearings size 16.

Figure 8A:
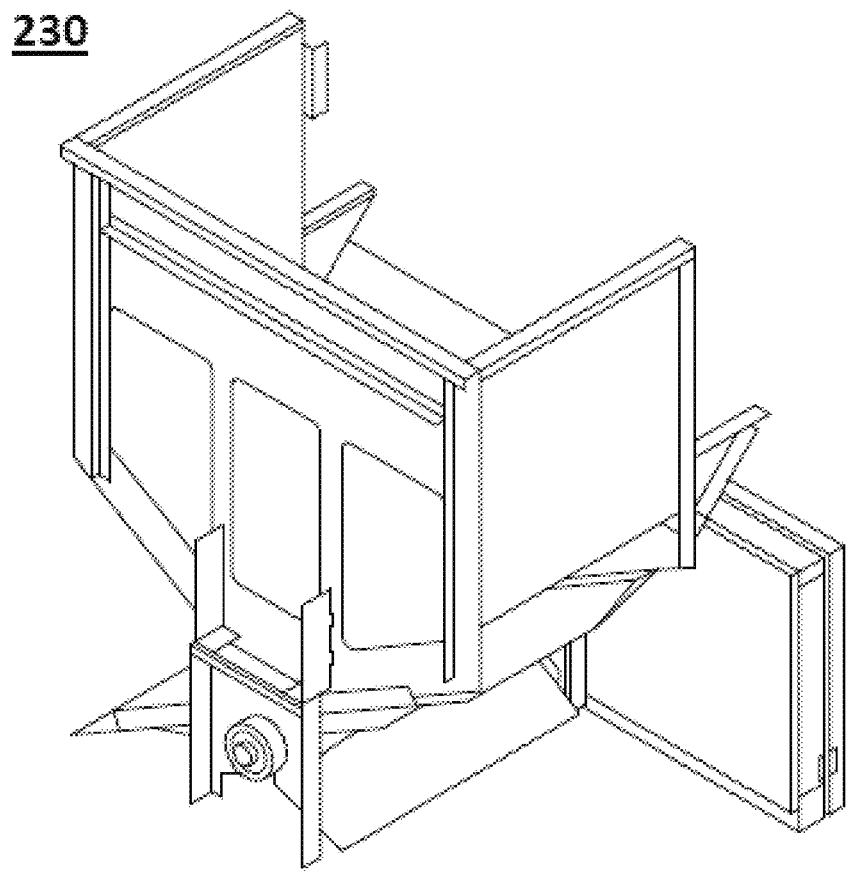
FIGS. 8A, 8B, BC, 8D, and 8E illustrate a perspective view, a side view, a front view, a detail of back view, and a back view, respectively, of an example hopper according to an example embodiment.
Figure 8B:
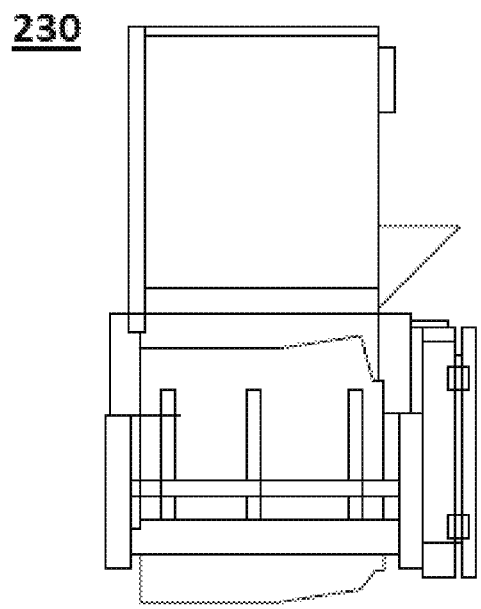
Figure 8C:
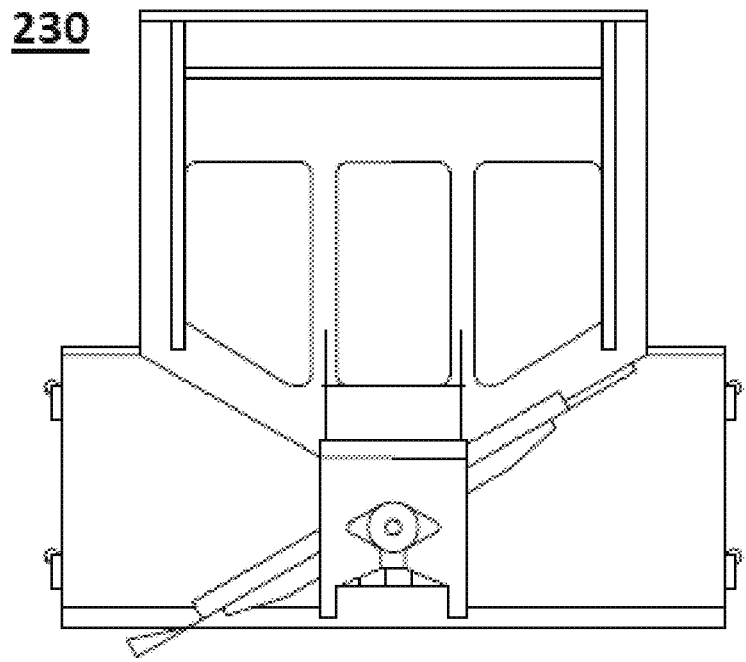
Figure 8D:
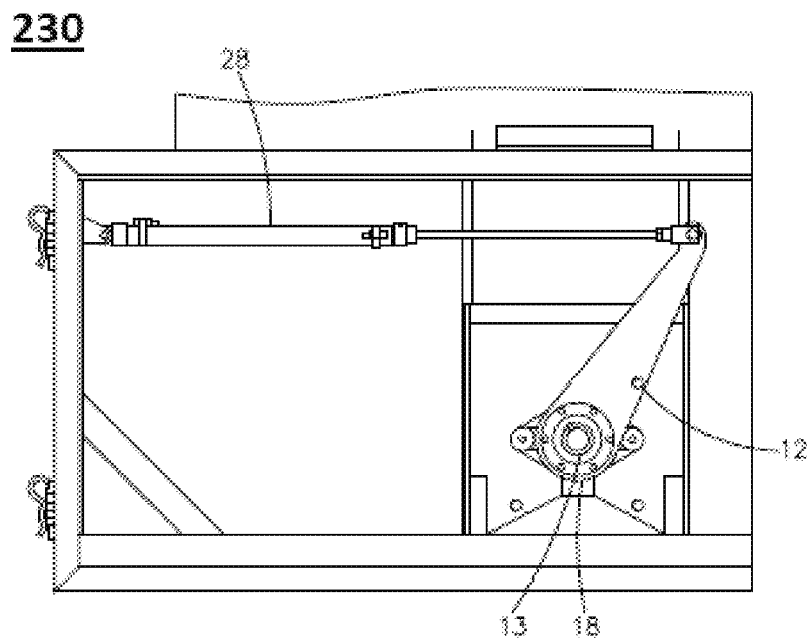
Figure 8E:
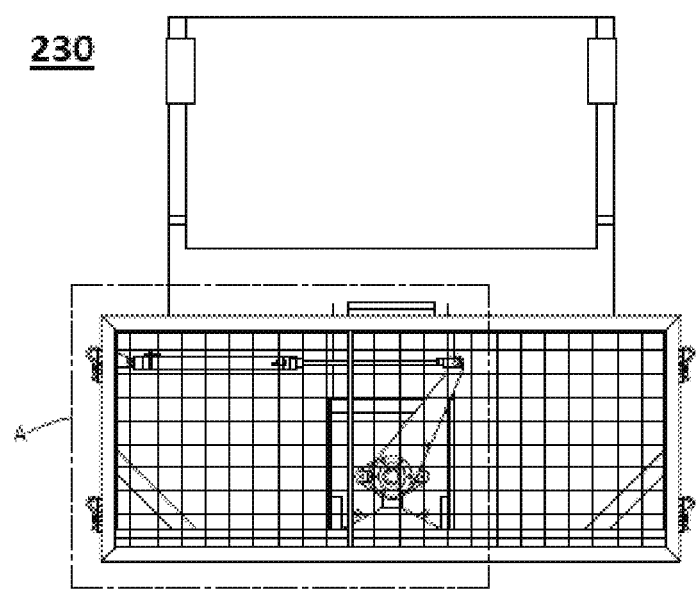
Figure 9A:
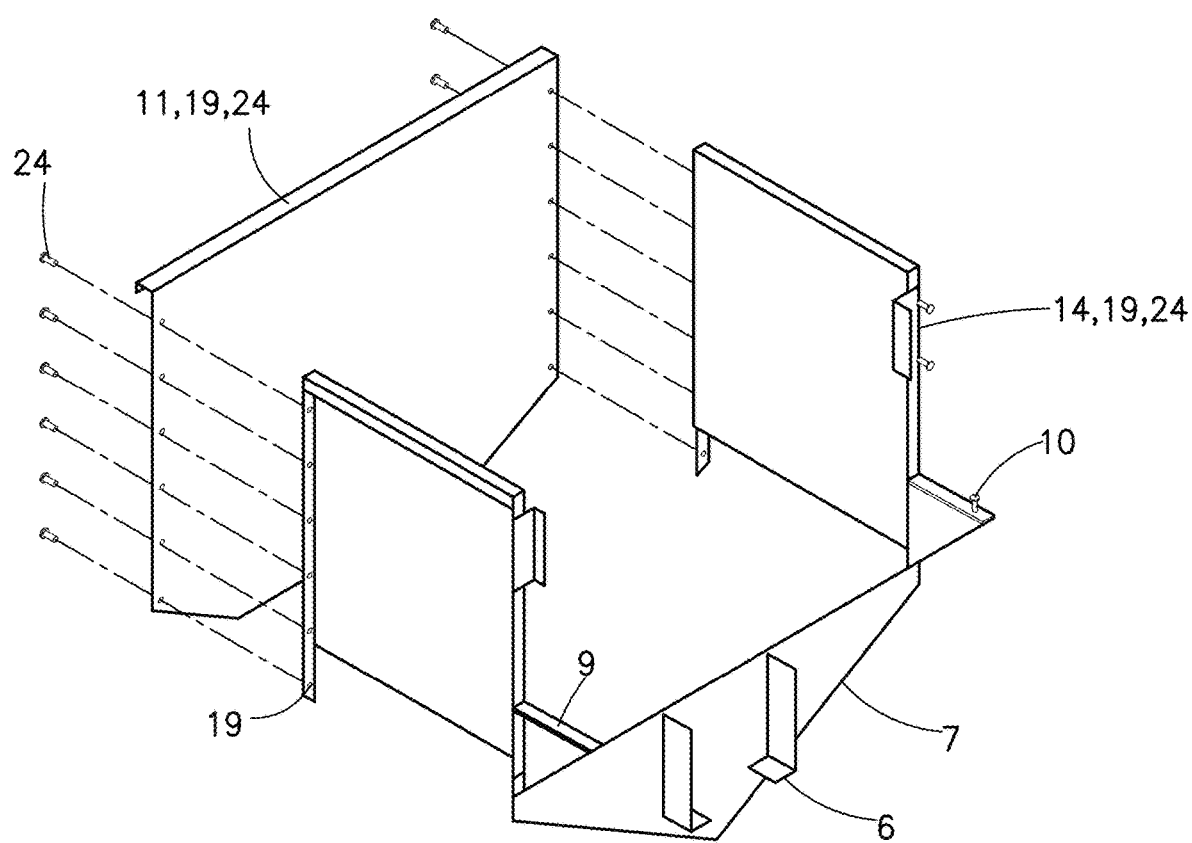
FIGS. 9A and 9B, and 9C illustrate an exploded view, an exploded view with the guard hidden of an example hopper according to an example embodiment.
Figure 9B:
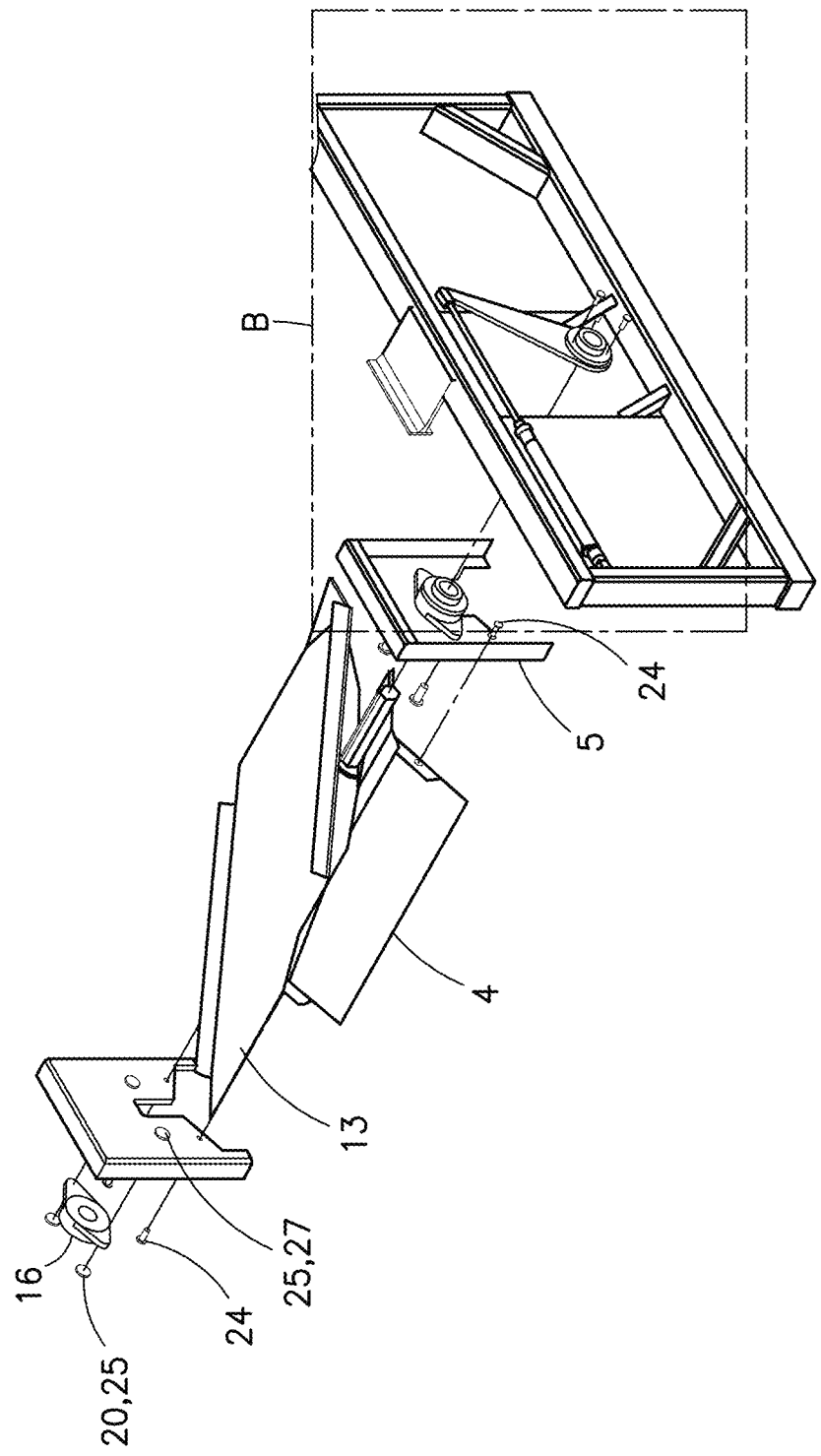
Figure 9C:
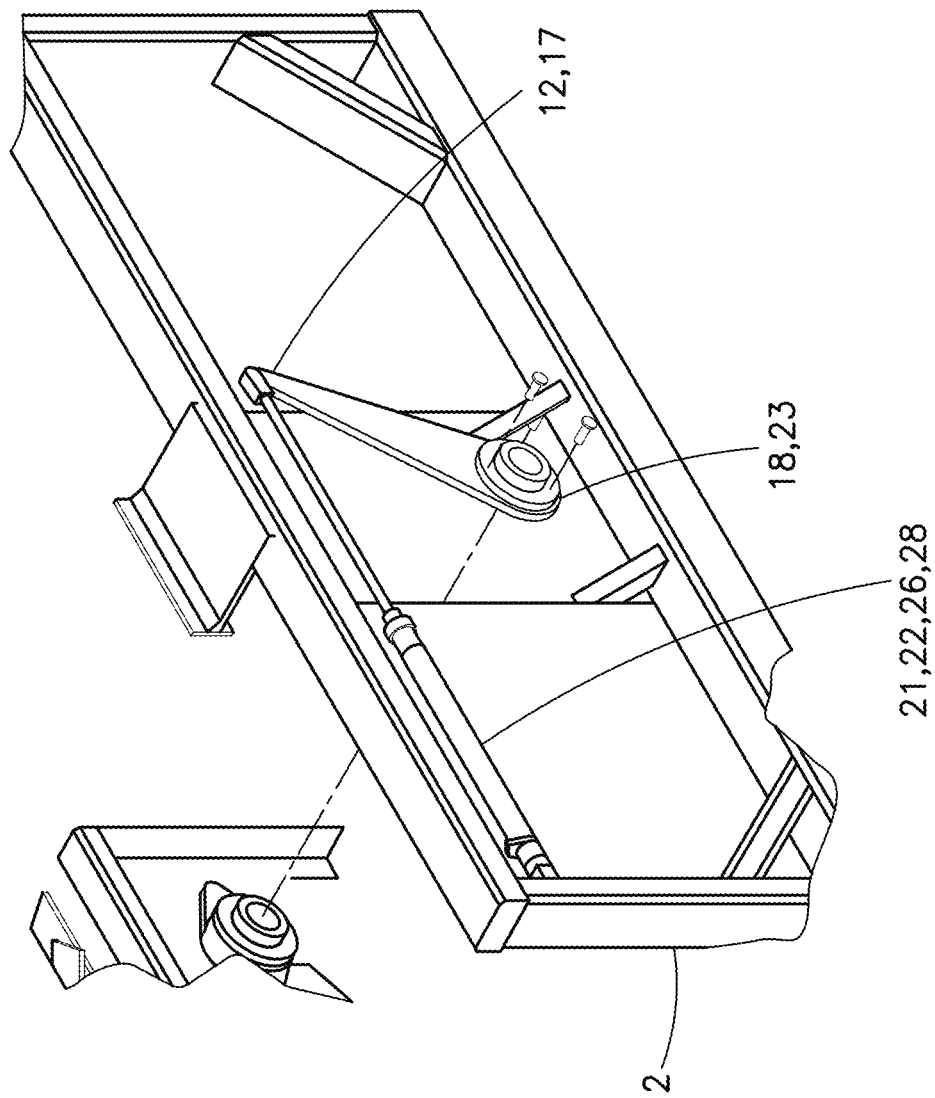

FIGS. 8A, 8B, 8C, 8D, and 8E illustrate a perspective view, a side view, a front view, a detail view of portion A of FIG. 8E, and a back view, respectively, of a hopper 230 according to an example implementation; while FIGS. 9A, 9B, and 9C illustrate an exploded view, an exploded view with the guard hidden, and a detail B, respectively, of an example hopper, in which: 1 is a ACB-02 temporary ship weldment; 2 is a cylinder weldment; 3 is a front panel weldment; 4 is a lower center support; 5 is a flange bearing mount bracket; 6 is a support angle; 7 is a rear steel panel; 8 is a side panel; 9 is a triangle bracket 2; 10 is a triangle bracket; 11 is a polycarb. panel; 12 is an actuator plate; 13 is a gate weldment; 14 is an angle to cleated conveyor; 15 is a cylinder guard; 16 is a 2-hold flange bearing and clamp for 1.5" diameter shaft; 17 is a bronze brushing—5.0 ID×8.0 OD×8 mm LG; 18 is a flanged shaft clamp for 1.5" diameter shaft with keyway; 19 is a hex nut, nylock, 5/16-18; 20 is a hex nut—½"-13; 21 is a hex nut—¼"-20; 22 is a ¼-20 UNC—2¼HS HCS; 23 is a ¼-20 UNC—7/8, HS HCS; 24 is a 5/16-18×7/8, HSBHCSI25 is a ½" washer; 26 is a ¼" washer; 27 is a ½-13 UNC—1.5, HBI; 28 is a pneumatic cylinder—25 mm bore ×305 mm (12") stroke; and 29 is a shock absorber with ¾-16 UNF thread-body.

Figure 10:
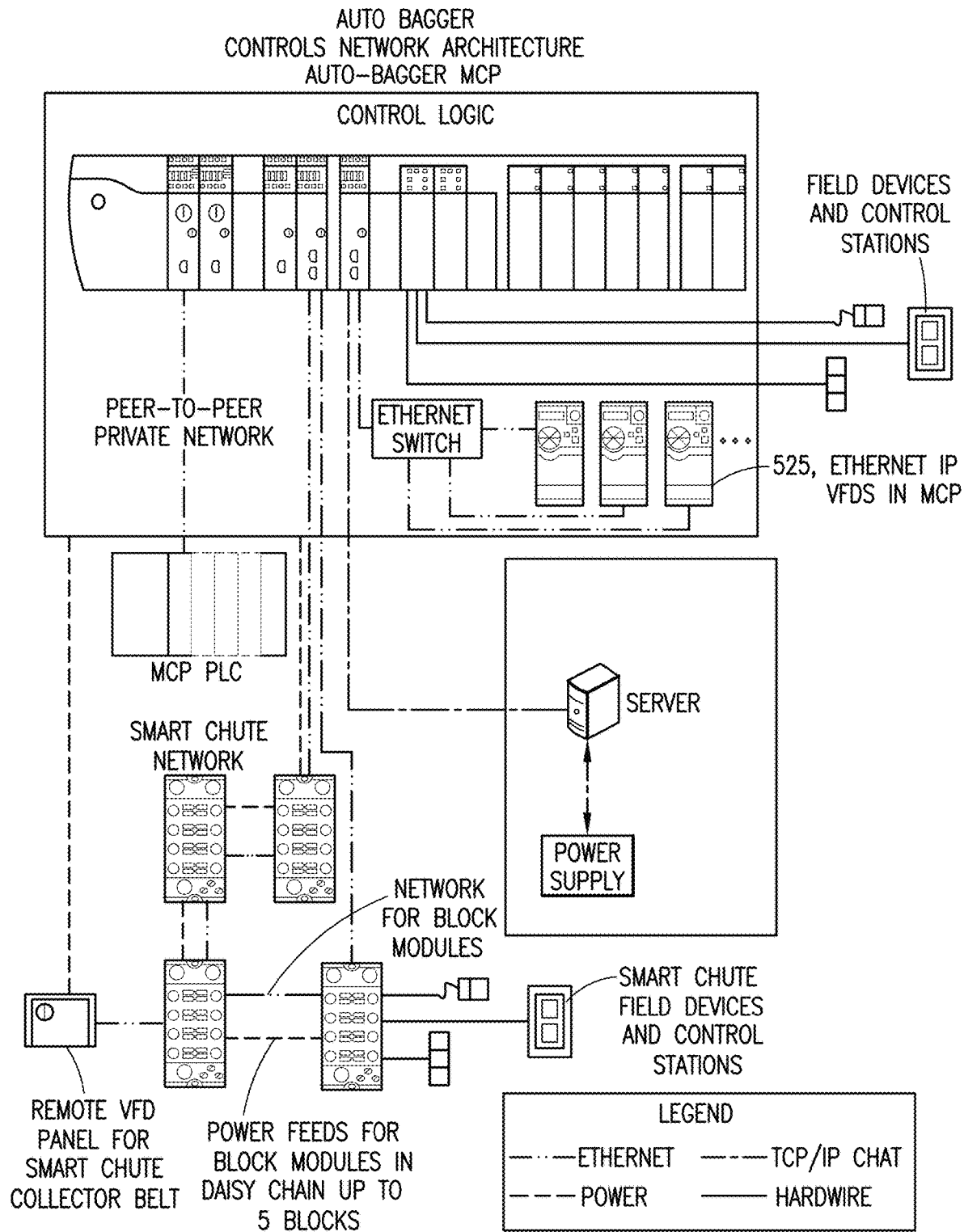
FIG. 10 is a schematic illustration of a main control panel according to an example embodiment.
Figure 11A:
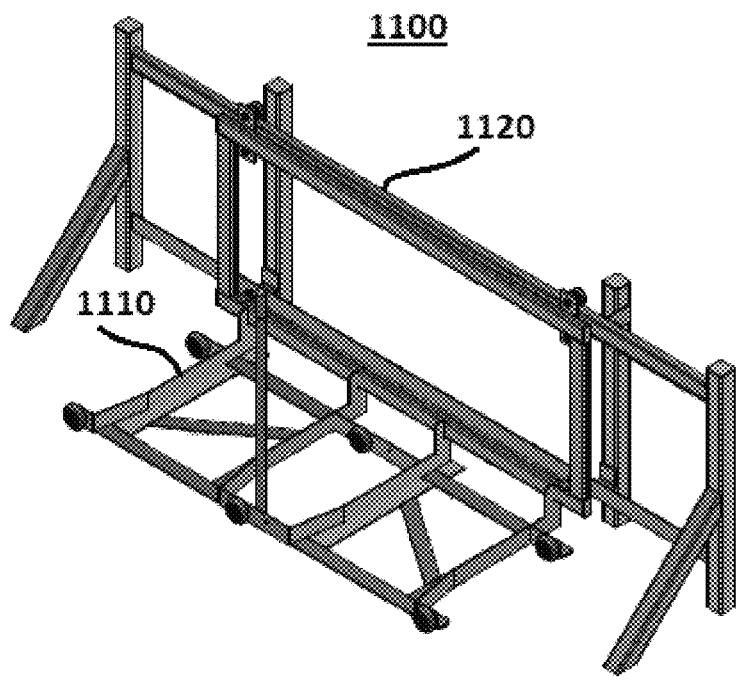
FIGS. 11A, 11B, 11C, and 11D illustrate, respectively, perspective, top, side and front views of a two-way linear rail assembly according to an example embodiment.
Figure 11B:
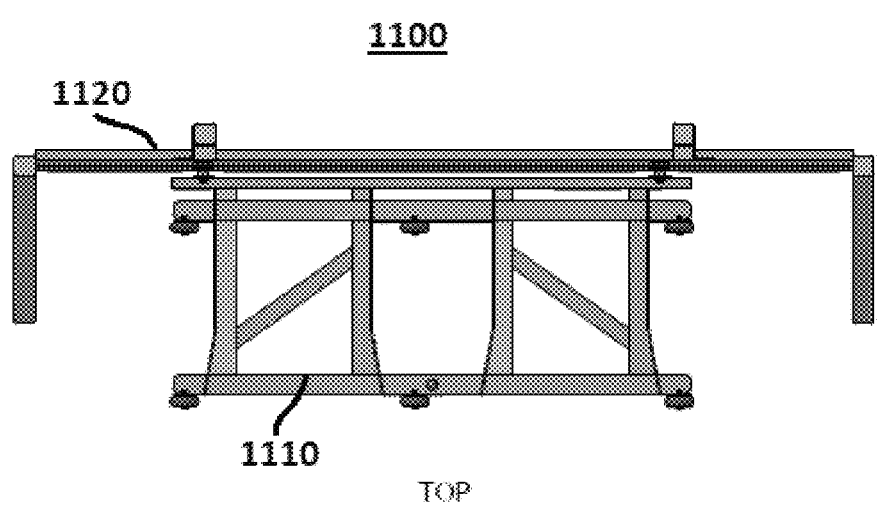
Figure 11C:
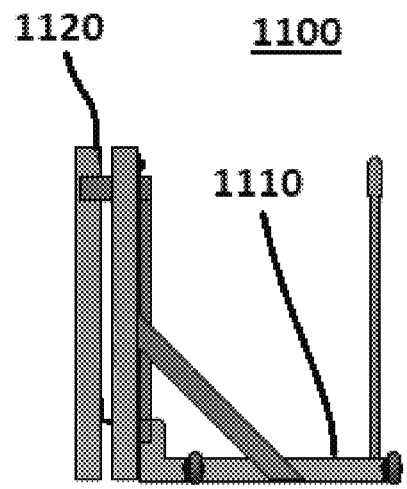
Figure 11D:
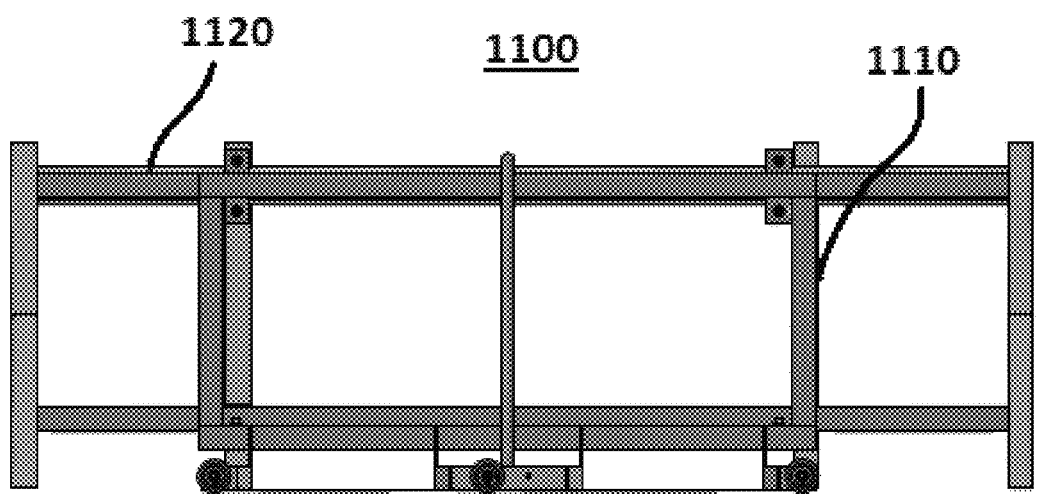
Figure 12A:
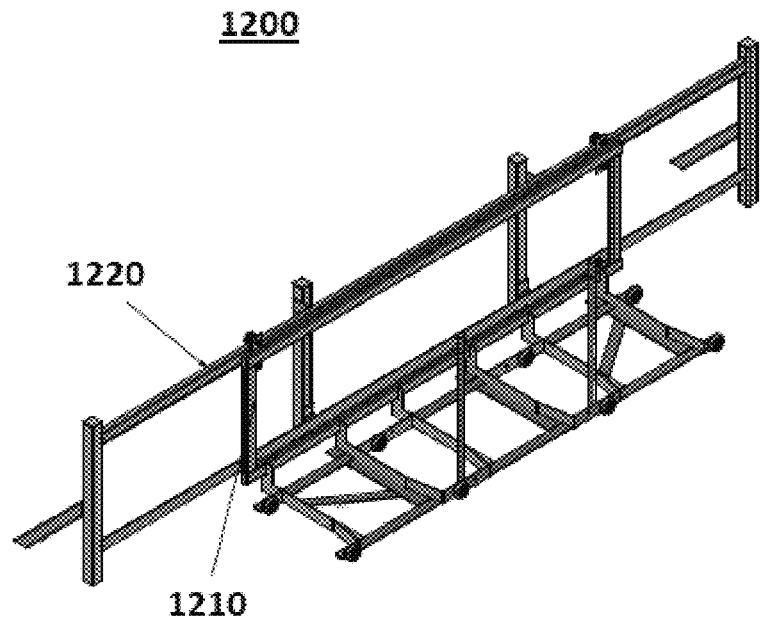
FIGS. 12A, 12B, 12C, and 12D illustrate, respectively, perspective, top, side and front views of a three-way linear rail assembly according to an example embodiment.
Figure 12B:
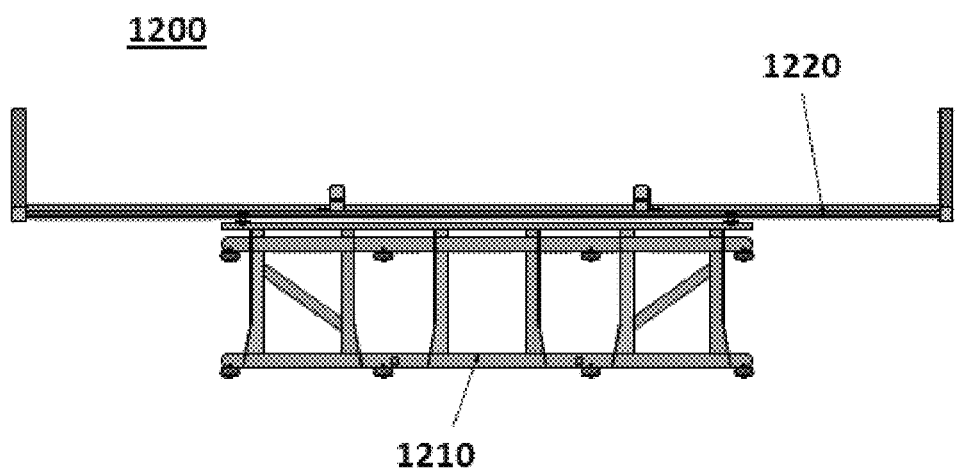
Figure 12C:
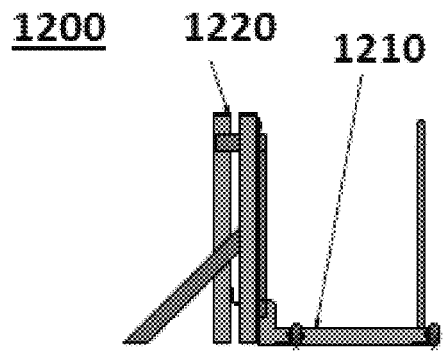
Figure 12D:
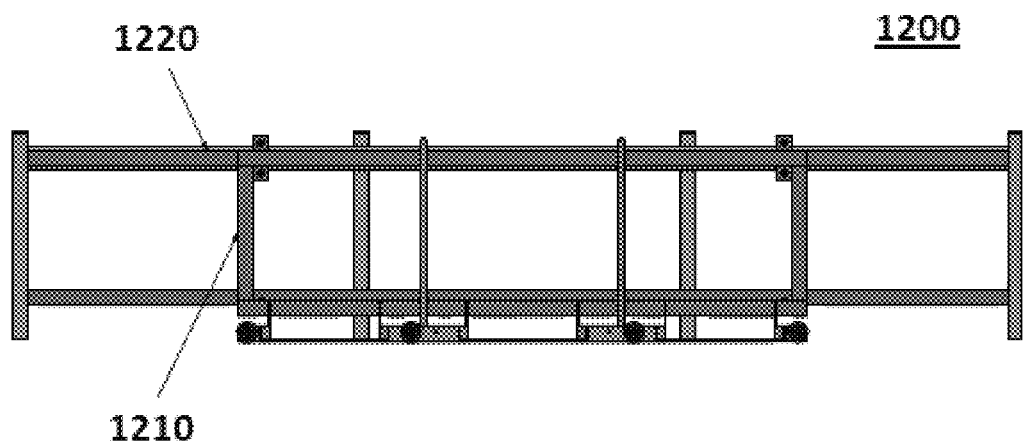
Figure 13A:
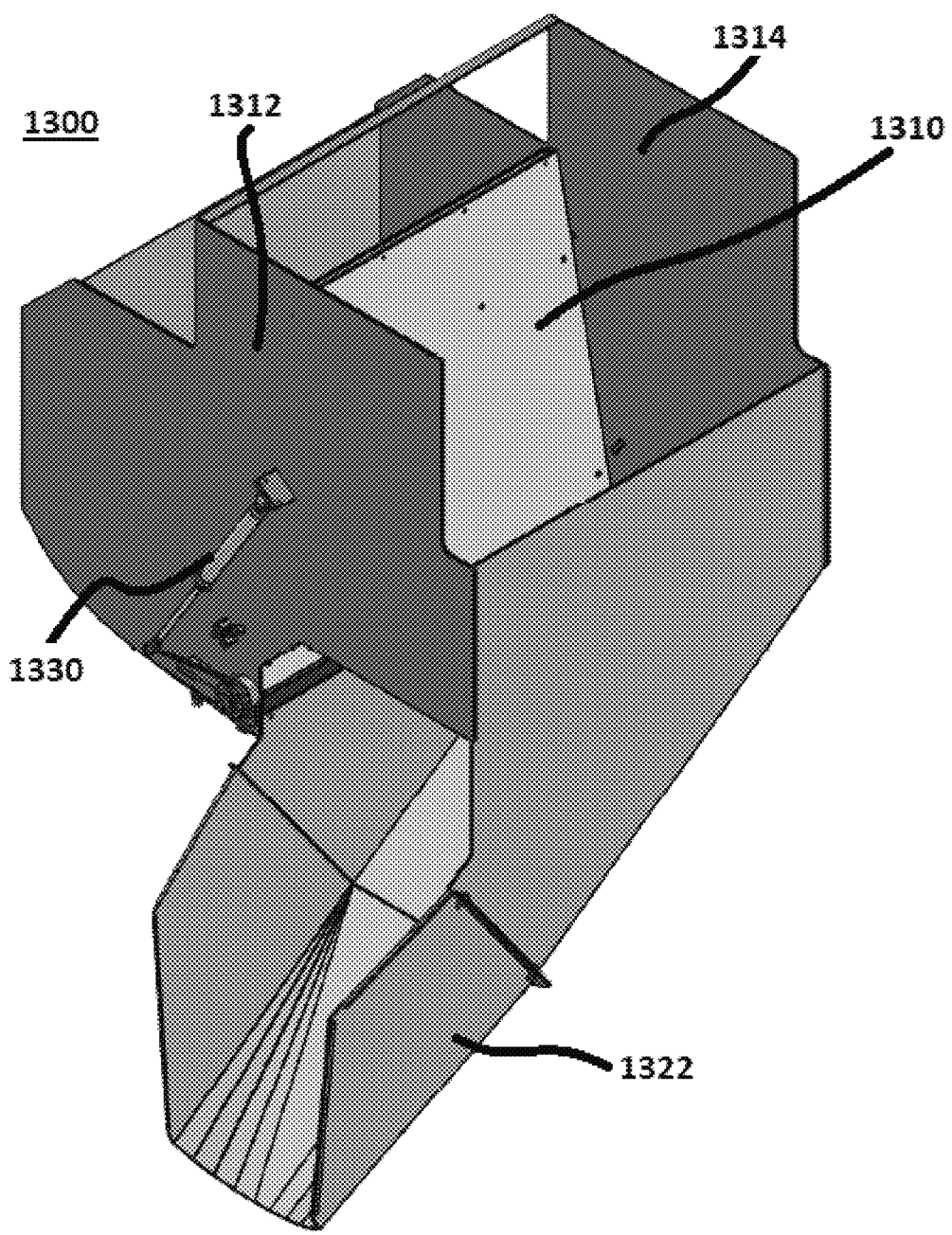
FIGS. 13A, 13B, 13C, and 13D illustrate, respectively, perspective, exploded perspective, side, and cross sectional (along cross section line of FIG. 13C) views of a hopper assembly according to an example embodiment.
Figure 13B:
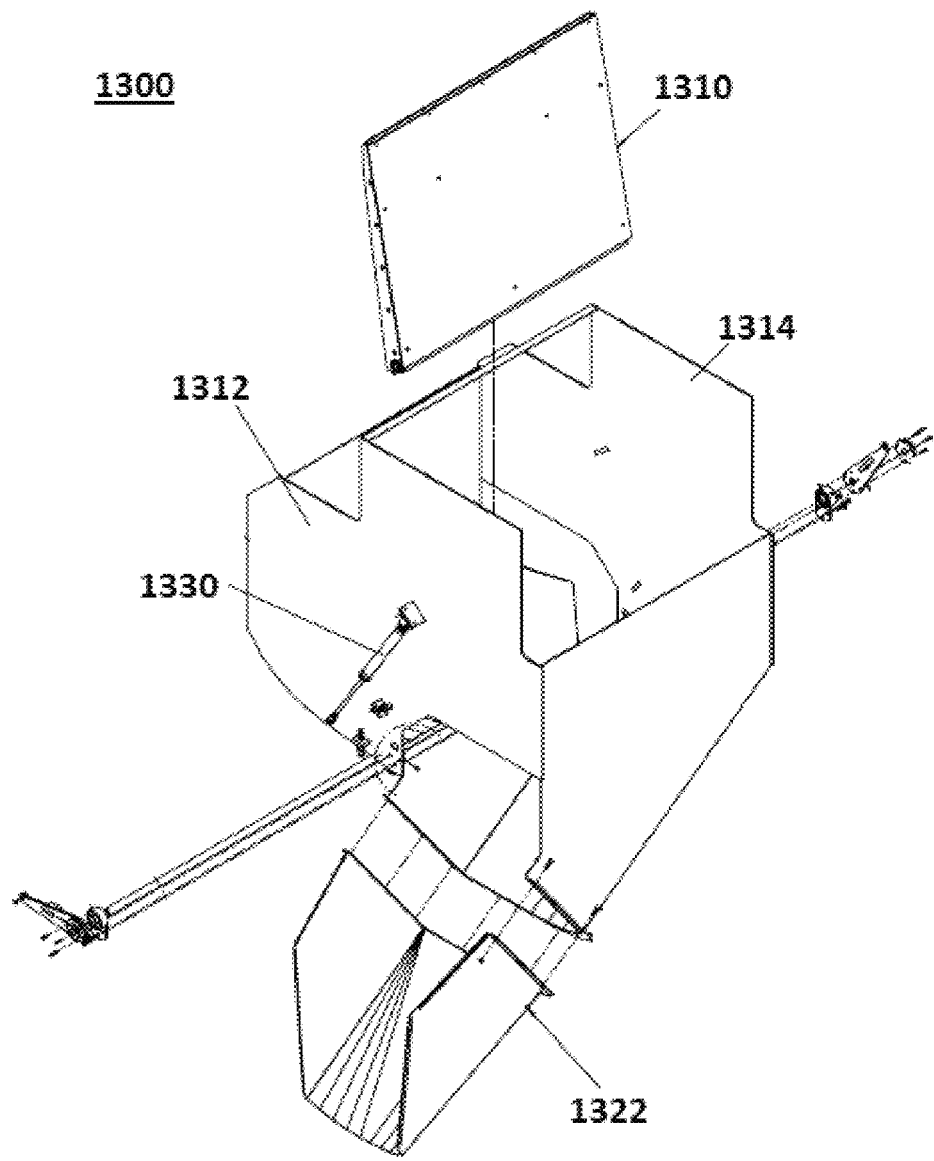
Figure 13C:
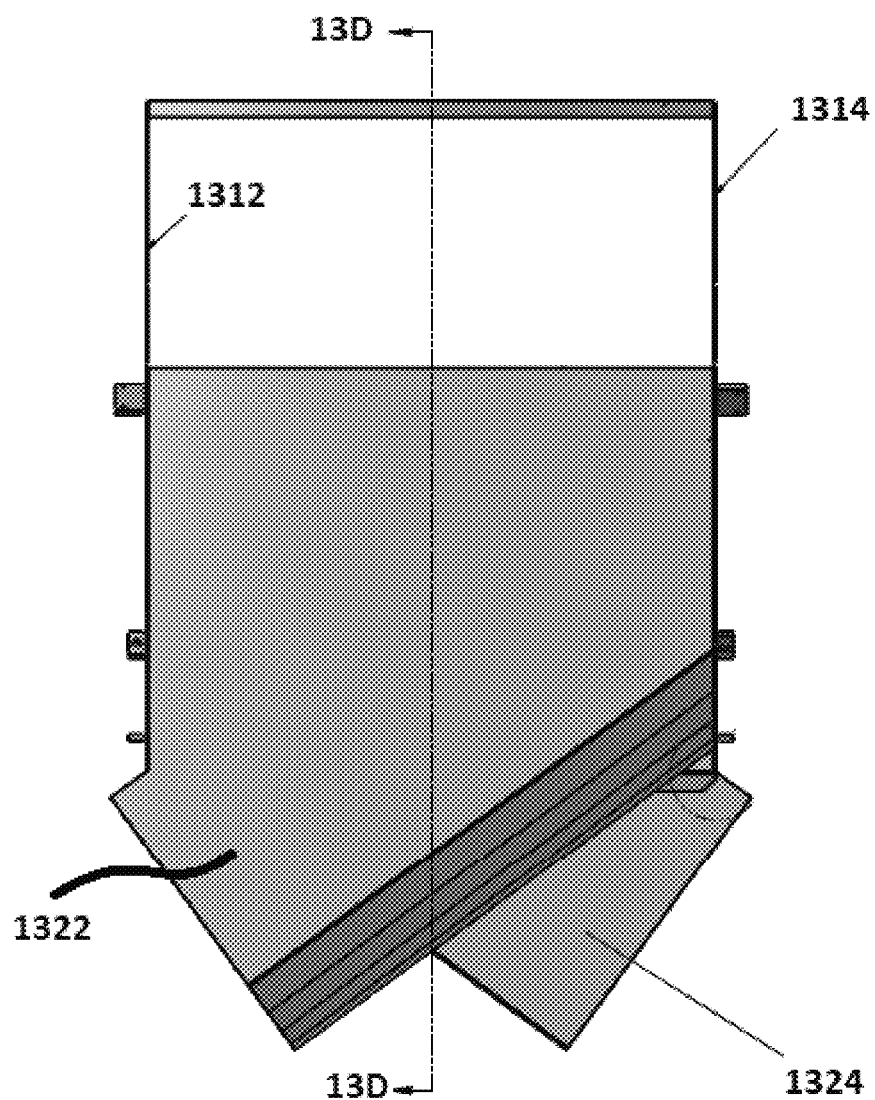
Figure 13D:
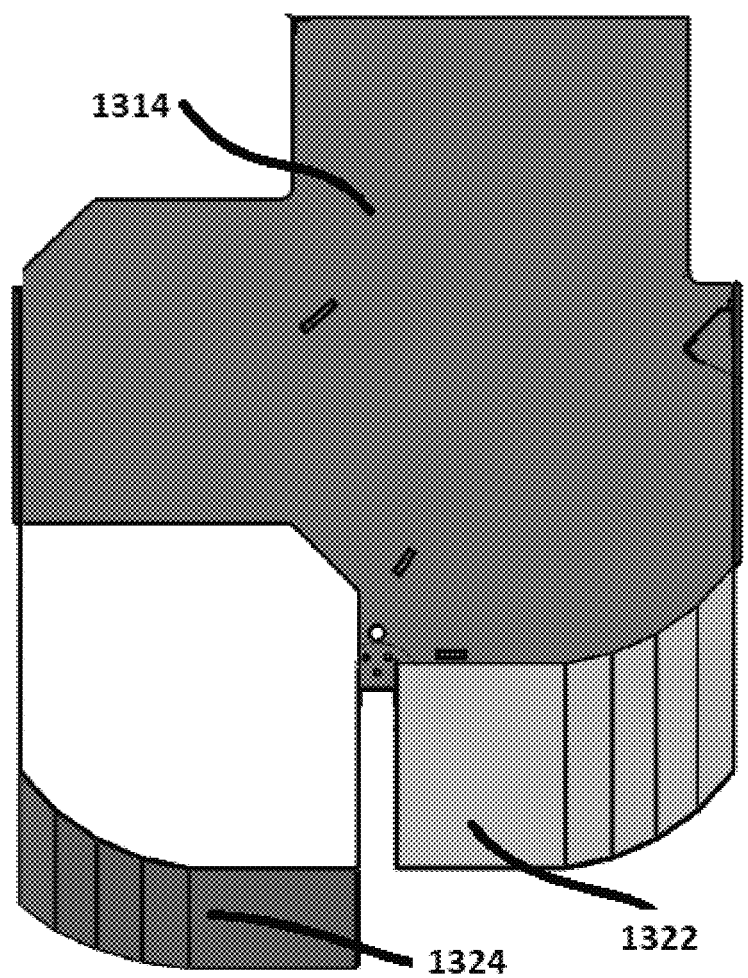

According to an example embodiment, a turnkey solution may include the provision and installation of conveyor systems, as described herein, as well as all motors and control devices. FIG. 10 is a schematic illustration of a main control panel according to an example embodiment. Such a main control panel can be installed to control an automatic sortation system, such any of those as described herein. The main control panel may include a plurality of input/output (I/O) modules, field devices, and implement variable frequency drive (VFD) technology. One or more main control panels may be networked together and may control coordinated operations. If a new main control panel is networked with an existing main control panel in an existing system, Human Machine Interface (HMI) and programmable logic controller (PLC) program development can be performed for the new main control panel and modifications, if any, may be made to programs in the existing main control panel to accommodate any new system elements.

According to an example embodiment, a two-way linear rail assembly can be provided as a replacement for merry-go-round configurations 236 and 238, such that, for example, a two-way linear rail assembly can be installed at each or any of the merry-go-round configurations 236 and 238 and/or carousel 233, 235 shown in an example of FIGS. 5A-5I. FIGS. 11A-11D illustrate an example implementation of a two-way linear rail assembly 1100 comprising a support 1120 and a carriage 1110.

In an example implementation, one or more bag carts, such as for example two surepost bag carts (TSK-03), can be loaded into respective position of carriage 1110 and located underneath a hopper, such as hopper 230. When a bag is full the operator can remove the bag, and for example take it to a collector conveyor. When the bag cart is empty of bags, carriage 1110 can be rolled over so that a bag cart full of empty bags can be placed underneath the hopper and the bags continue to be filled. While an operator is filling bag at a current position another operator can remove an empty bag cart and replace it with a cart full of bags.

According to an example embodiment, a three-way linear rail assembly can be provided as a replacement for merry-go-round configurations 236 and 238, such that, for example, a two-way or a three-way linear rail assembly can be installed at each or any of the merry-go-round configurations 236 and 238 and/or carousel 233, 235 shown in an example of FIGS. 5A-5I. FIGS. 12A-12D illustrate an example implementation of a three-way linear rail assembly 1200 comprising a support 1220 and a carriage 1210.

In an example implementation, one or more bag carts, such as for example three surepost bag carts (TSK-03), can be loaded into respective position of carriage 1210 and located underneath a hopper, such as hopper 230. When a bag is full the operator can remove the bag, and for example and take it to a collector conveyor. When the bag cart is empty of bags, carriage 1210 can be rolled over so that a bag cart full of empty bags can be placed underneath the hopper and the bags continue to be filled. While an operator is filling bag at a current position another operator can remove an empty bag cart and replace it with a cart full of bags.

Referring to FIGS. 13A-13D, in an exemplary embodiment, a hopper 1300 can be used in place of hopper 230, for example when using a linear rail assembly, such as assembly 1100 or 1200, for two loading positions, which can be referenced as positions A and B. In an exemplary implementations, a three-position linear rail assembly, such as assembly 1200, can be placed under both sides of the chutes. A cleated conveyor assembly, such as assembly 212, can be configured to feed packages between side plates 1312 and 1314 of hopper 1300, and based on a predetermined or desired destination of a slug of packages, a gate assembly 1310 can be turned, for example to 90 degrees, if packages need to go to chute 1322, or for example to 45 degrees if packages need to go to chute 1324. In an example implementation, gate 1310 can be actuated by a pneumatic cylinder 1330 which can be configured on one side, or both sides, of the hopper assembly 1300. Hopper assembly 1300 can be used for example when less packages per hour are needed, and less space is available since it can be implemented to have two positions to feed two linear rail assemblies, such as assemblies 1100 and/or 1200.

Figure 14A:
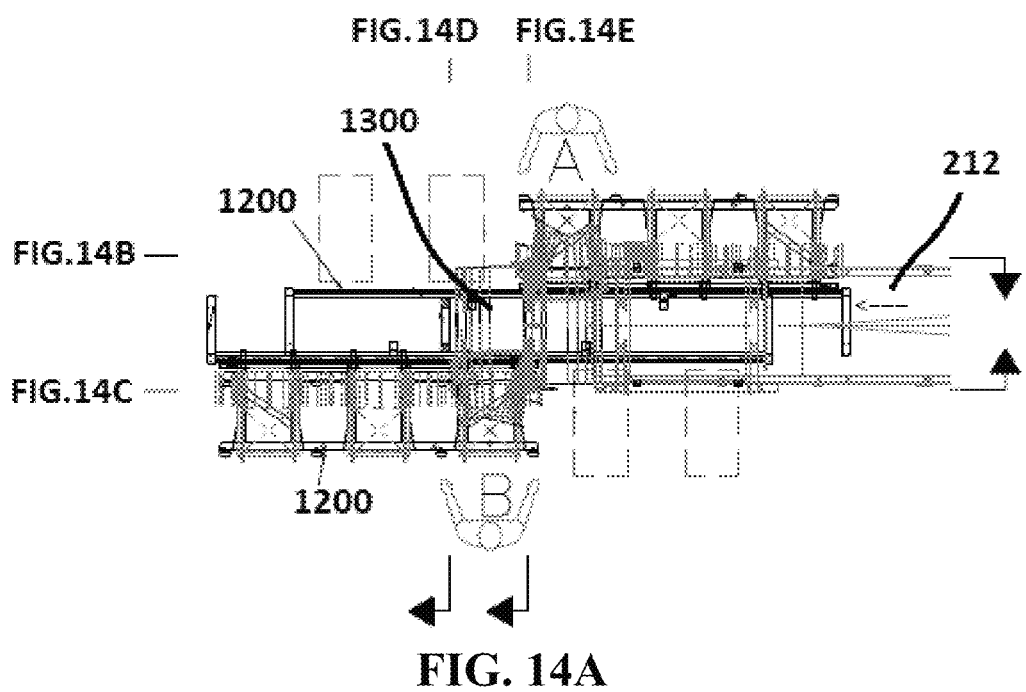
FIGS. 14A, 14B, 14C, 14D and 14E illustrate, respectively, plan view and four different cross section views (along labeled cross section lines of FIG. 14A) of a system according to another example embodiment.
Figure 14B:
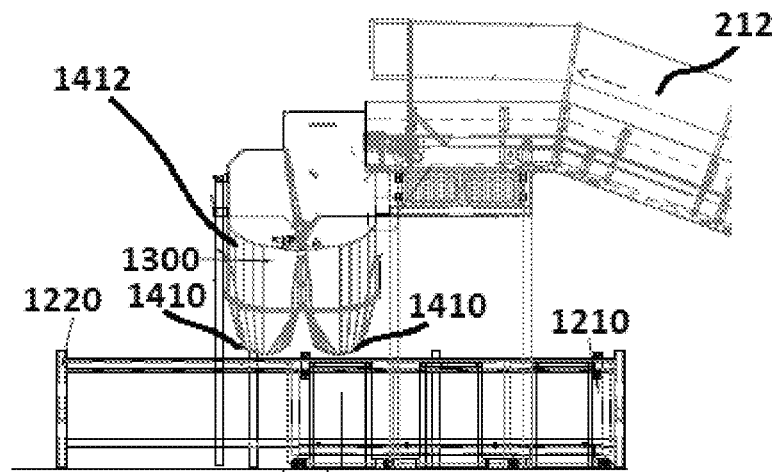
Figure 14C:
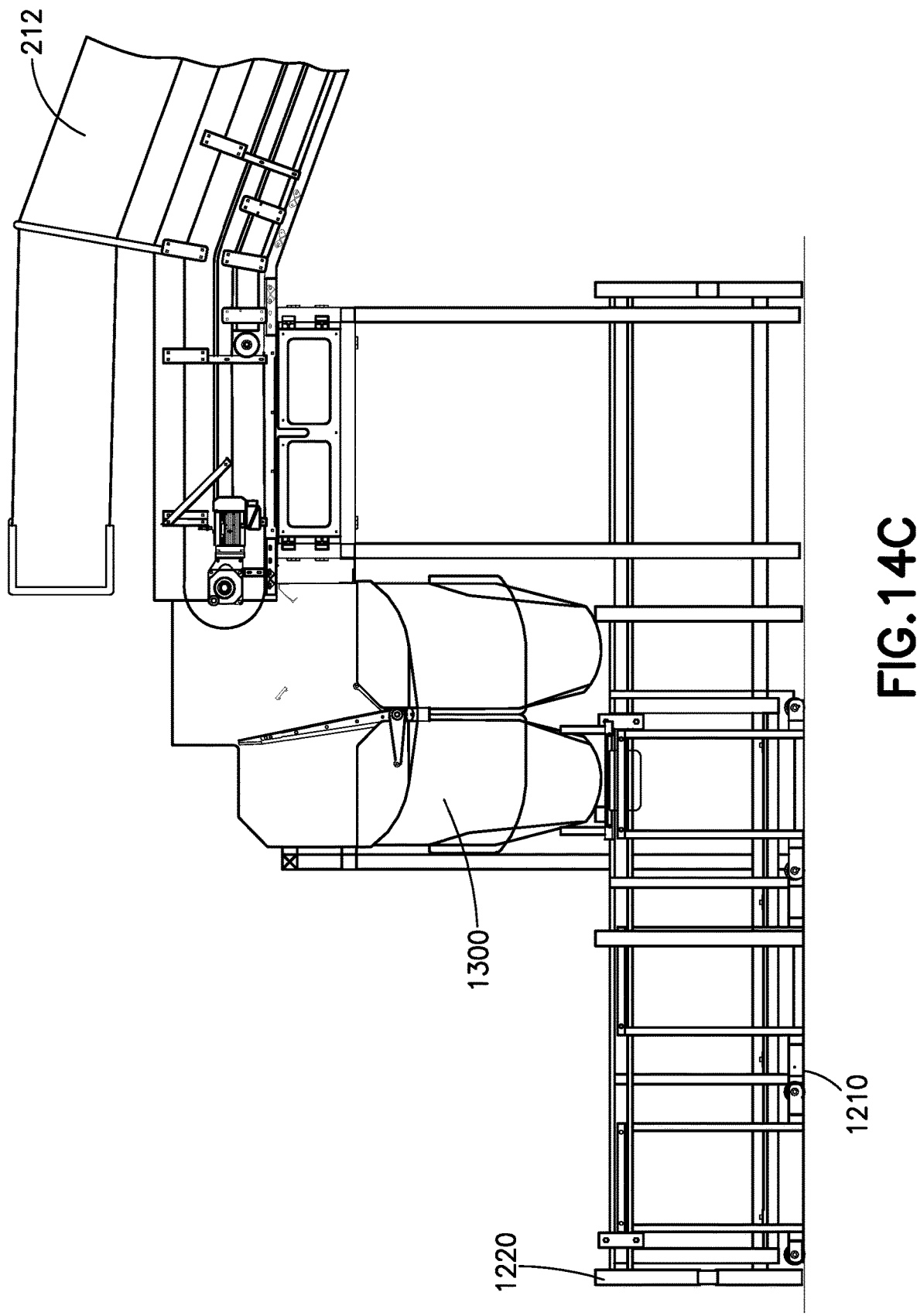
Figure 14D:
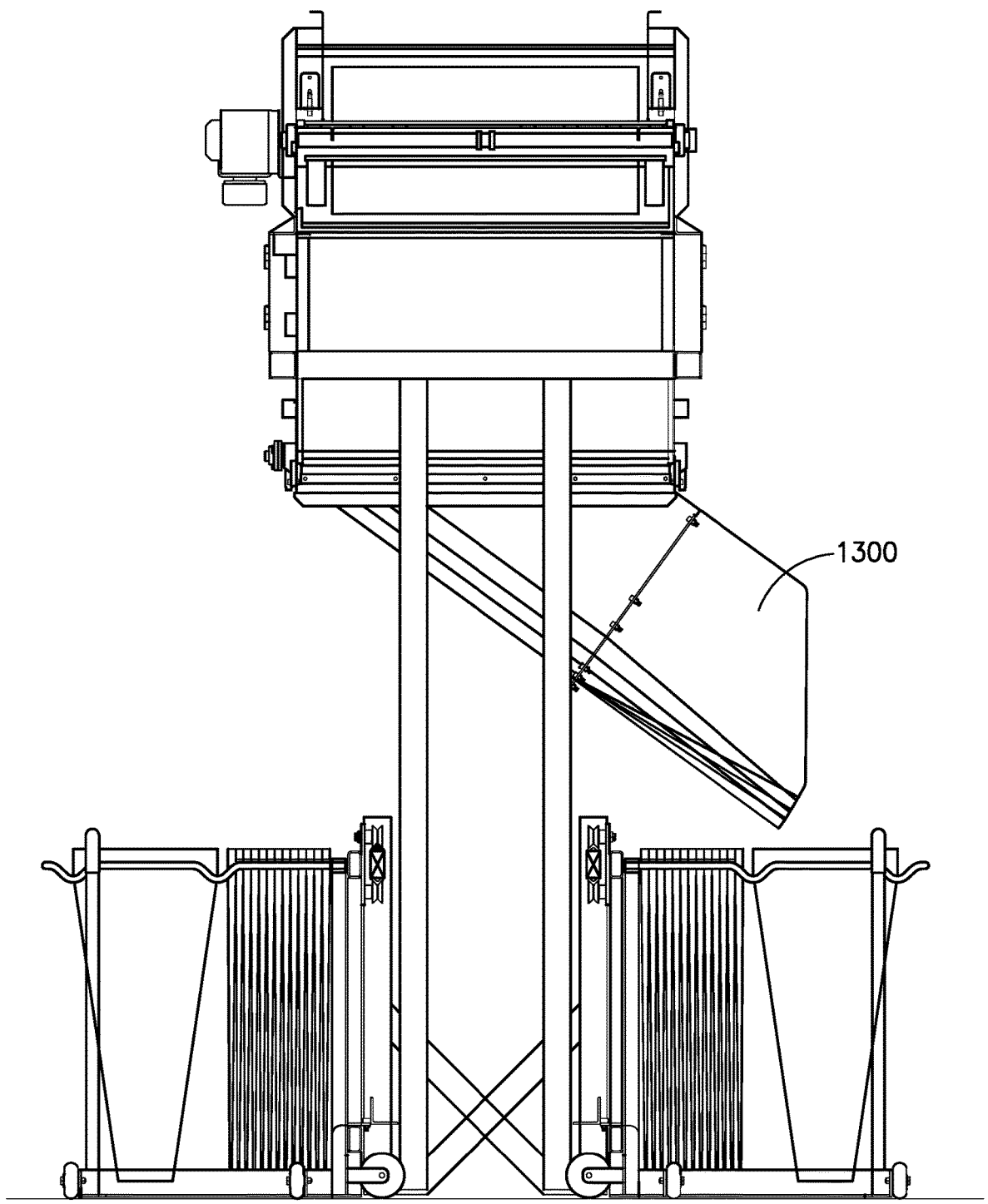
Figure 14E:
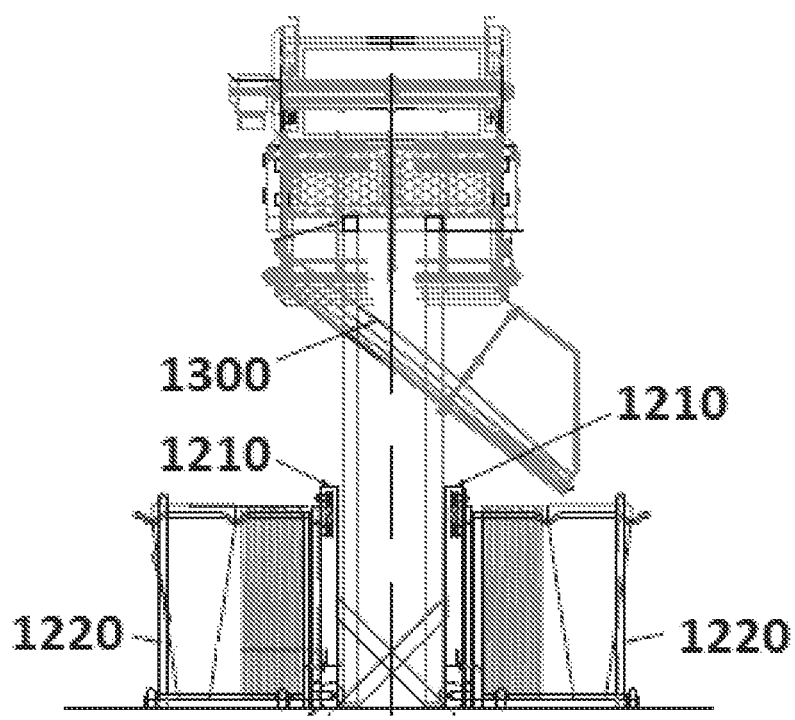
Figure 15A:
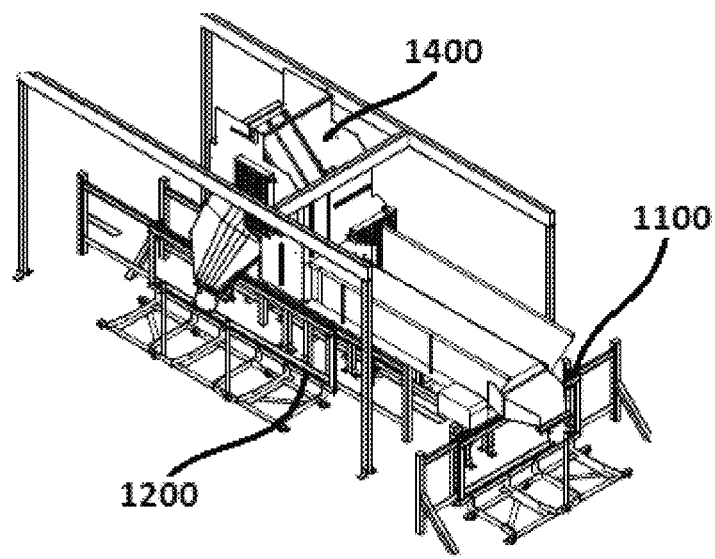
FIGS. 15A, 15B, 15C, 15D, 15E, 15F, 15G and 15H illustrate, respectively, an isometric view, a plan view and six different cross section views (along labeled cross section lines of FIG. 15B) of a system according to yet another example embodiment.
Figure 15B:
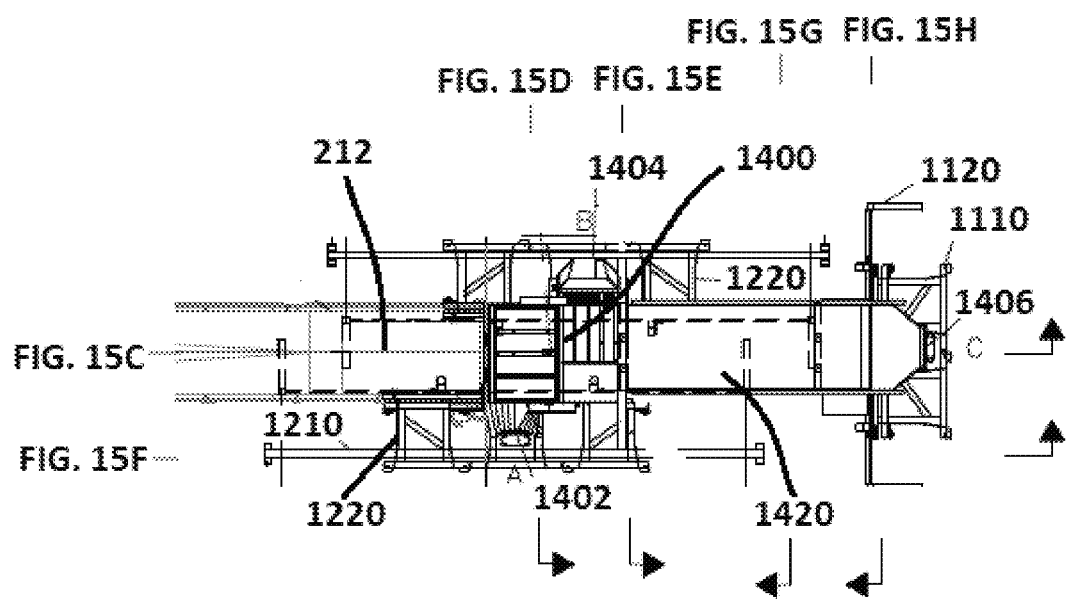
Figure 15C:
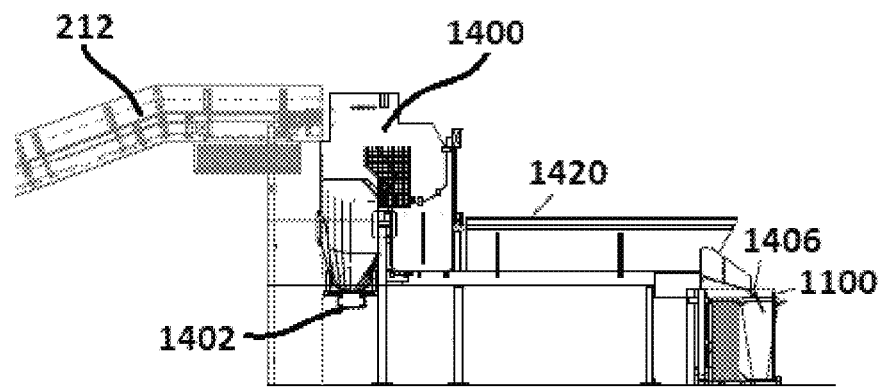
Figure 15D:
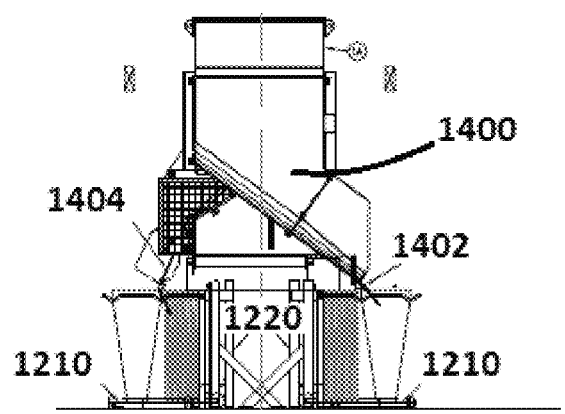
Figure 15E:
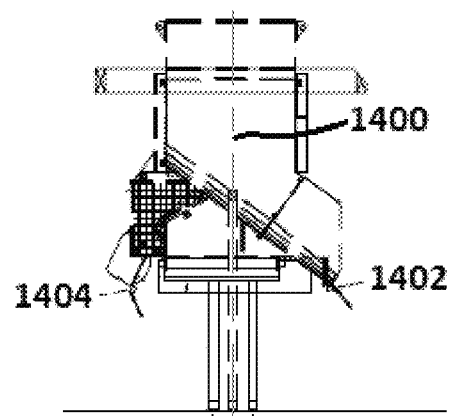
Figure 15F:
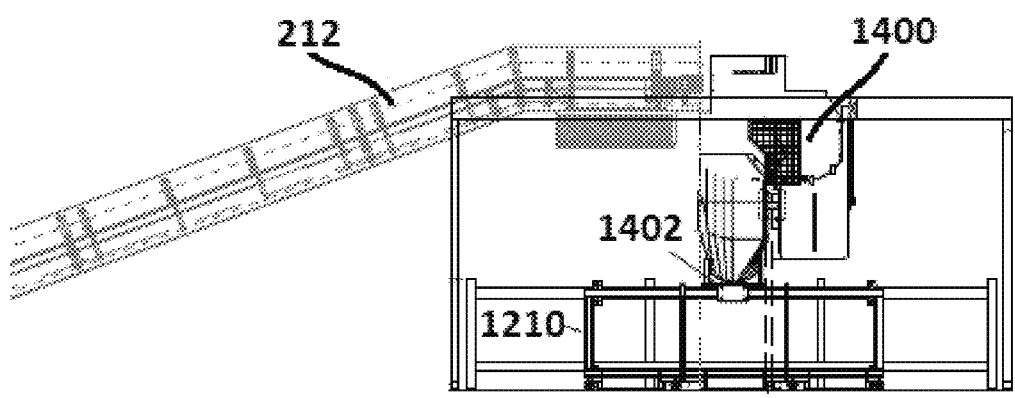
Figure 15G:
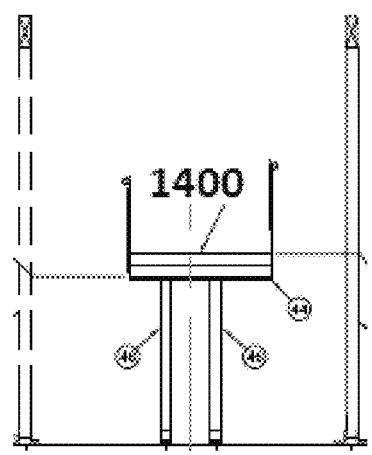
Figure 15H:
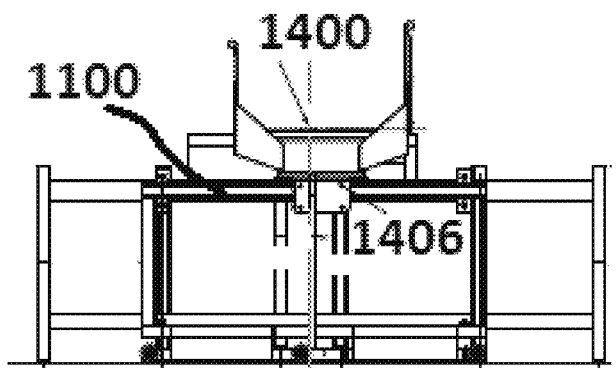

FIGS. 14A-14E illustrate in an enlarged schematic plan view and various cross sectional views, respectively, example embodiment of a system, such as system 500, 200, or 250, implementing hopper 1300 and linear rail assemblies 1100 and/or 1200. Example implementations shown in FIGS. 14A-14E illustrate how a hopper 1300 integrates with a cleated conveyor 212 and three-way linear rail assemblies 1200. As illustrated in FIG. 14A, packages feed from a cleated conveyor 212 to either side to each operator A and B. In an exemplary implementation, a flip gate 1410 can be provided on the end of a chute of hopper 1300 that the operator flips up or down to hold each bag in place while packages are dropping into them. In yet further exemplary implementation, a hopper curtain 1412 can be provided to slow down packages as they fall down the chute of hopper 1300.

FIGS. 15A-15H illustrate in an isometric view, enlarged schematic plan view and various cross sectional views, respectively, another example embodiment of a system, such as system 500, 200, or 250, implementing hopper 1400 and linear rail assemblies 1100 and/or 1200. Exemplary implementations shown in FIGS. 15A-15H illustrate how a hopper 1400 integrates with the cleated conveyor 212 and the two-way linear assemblies and three-way linear assemblies. In an exemplary implementation, hopper 1400 has similar function to that of hopper 1300; however, in addition to the two positions A and B of hopper 1300, hopper 1400 implements an added third position, C, 1406. According to an exemplary implementation, a first gate assembly 1402 of hopper 1400 flips up or down to either feed the A position or B position, and a secondary gate 1404 can implemented at the B position that flips up or down to continue down the B position or feed onto a conveyor that takes the slug of packages on a belted conveyor 1420 to the C position. In a further exemplary implementation, A and B positions can be configure to feed a three-way linear rail assembly 1200 and the C position feed a two-way linear rail assembly 1100. An exemplary configuration of FIGS. 15A-15H can be used when, for example, more packages per hour are needed and/or the floor space is sufficient.

FIGS. 16A-16E illustrate in an isometric view, enlarged schematic plan view and various cross section and enlarged views, respectively, another example embodiment of a system, such as system 500, 200, or 250, implementing cleated conveyor 1600. Exemplary implementations shown in FIGS. 16A-16E illustrate how cleated conveyor 1600 can be configured with hopper 1400 and linear rail assemblies 1100 and/or 1200.

Figure 16A:
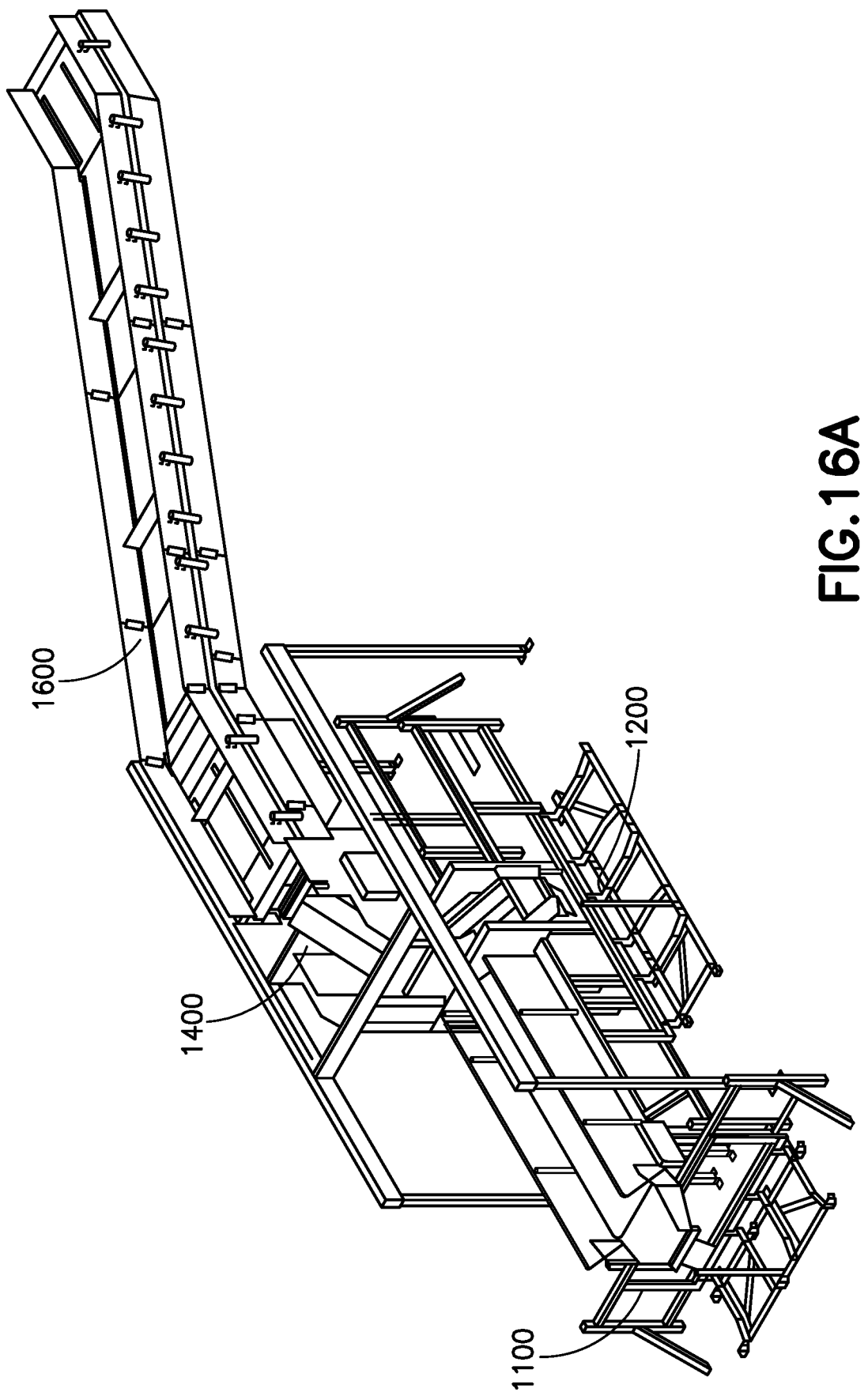
Figure 16C:
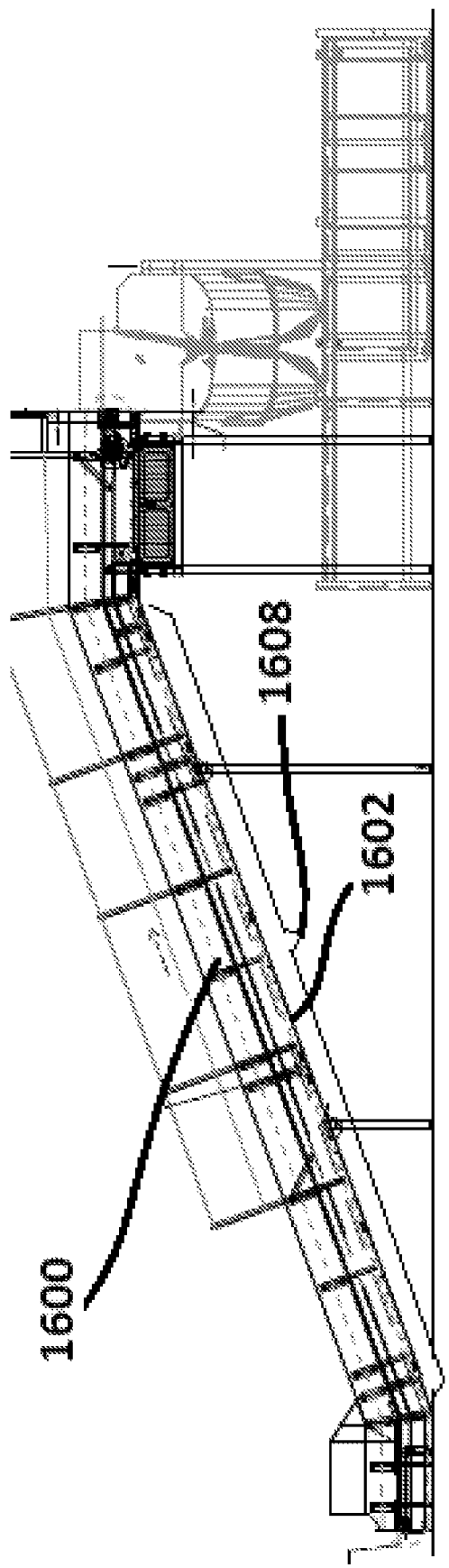
Figure 16D:
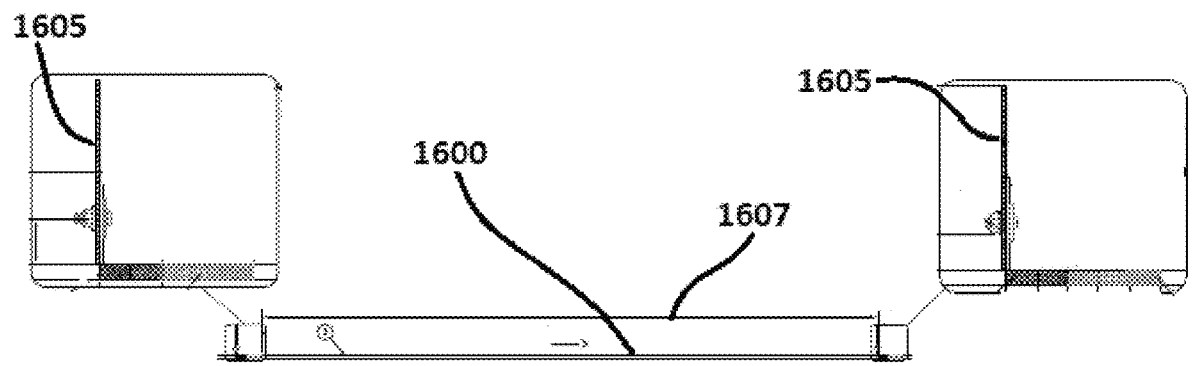
Figure 16E:
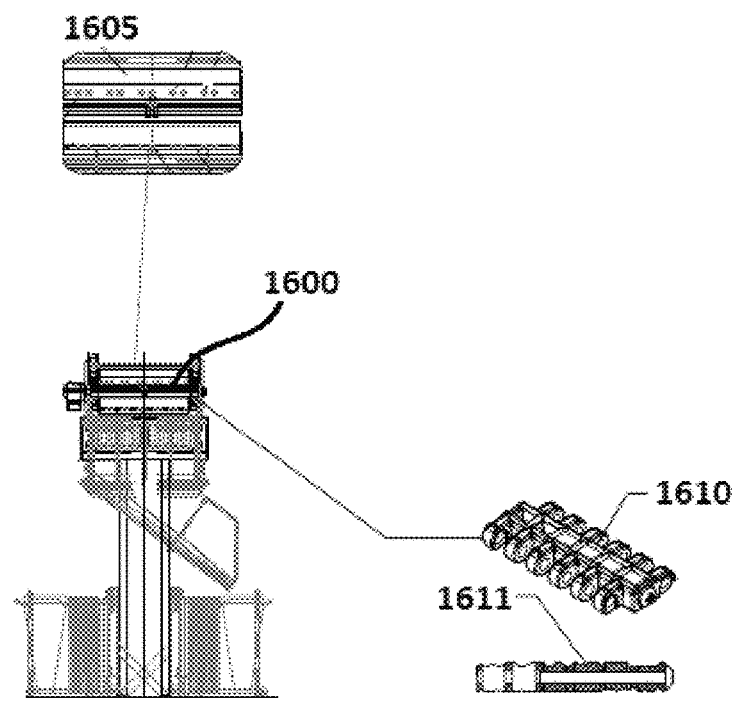

More generally, FIGS. 16A-16E illustrated an example of the cleated conveyor assembly 1600 that can feed either hopper 1300 or hopper 1400, and the processing using conveyor 1600 can also be performed as in the example of FIGS. 5D 5E 5F and 5G. FIG. 16A example shows cleated conveyor 1600 and the hopper 1400 along with three-way linear rail assembly 1200 and two-way linear rail assembly 1100.

Referring further to FIGS. 16A-16E, details of example implementations can include custom belting 1604 that takes slugs of packages up an incline 1602 in section 1608. In an exemplary implementation, belting 1604 can include cleats 1605 configured at intervals 1607 on belting 1604. In an exemplary implementation, incline 1602 can be about 20 degrees from horizontal.

In yet further exemplary implementations, custom flags (for example, metal) can be embedded in the belting to trigger a proximity sensor 1610 and keep the belting tracked so that the location of essentially each slug of packages is the conveyor 1600 can be determined. In an example implementation, proximity sensors 1610 can be installed on both sides of belting 1604, for example on an outside edge thereof. In a further example implementation outside sprockets 1611 on head and tail are installed so that they will not interfere with the proximity blocks.

Figure 17A:
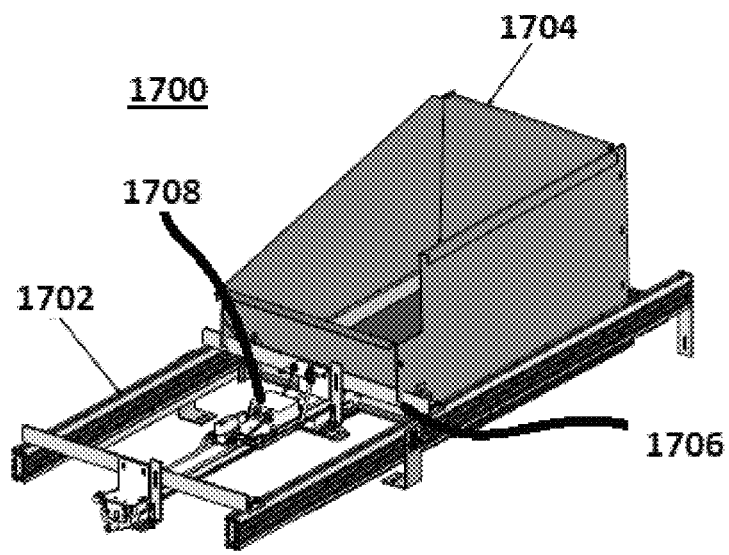
FIGS. 17A, 17B, and 17C illustrate, respectively, an isometric view, a top view and a side view of a smart bin according to another example embodiment.
Figure 17B:
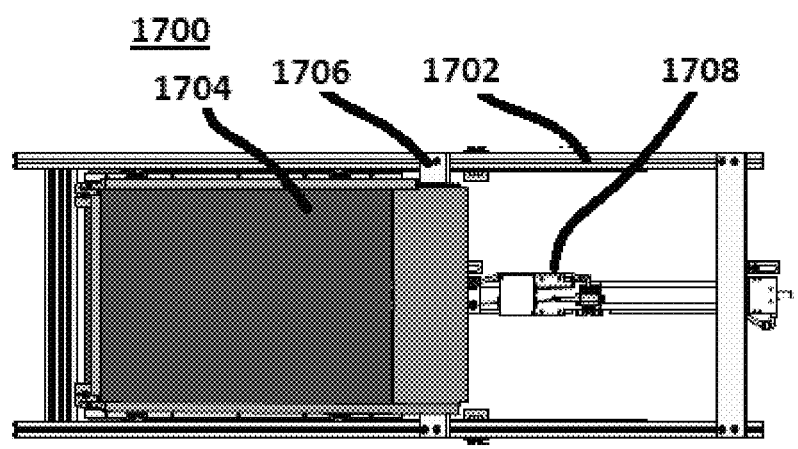
Figure 17C:
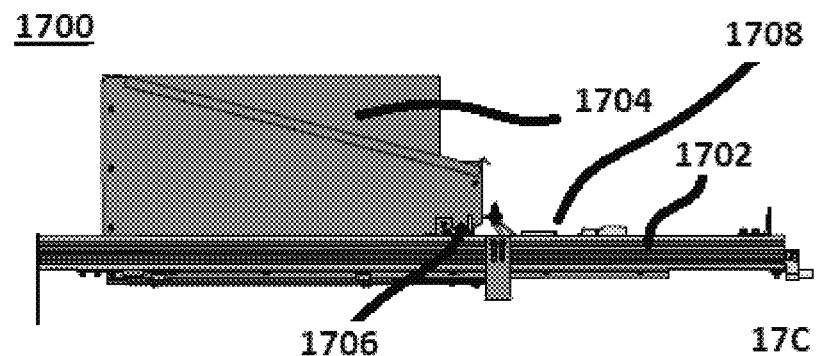

FIGS. 17A-17C illustrate in an isometric view, top view and side view, respectively, another example embodiment of a smart bin 1700 that can be deployed in any one of systems 500, 200, or 250, implementing cleated conveyor 212 or 1600, and any one of hopper configurations such as hopper 230, hopper 1300, or hopper 140, and either a carousel or linear rail assembly.

In an example implementation, smart bin 1700 can have at least the functionality similar to that of a smart bin 202 described with reference to FIGS. 6A-6E above. According to further example implementations, smart bin 1700 can comprise hold-down tabs 1706 on the front of bin body 1704, so that package weight does not shift the bin for example with respect to frame assembly 1702. According to yet further exemplary implementations, smart bin 1700 can comprise proximity flags and one or more sensor added to for example slide cylinder 1708 for a more accurate readings when the gate is opened or closed.

Another example embodiment, which can be implemented independently of, or complimentary to, an automated sortation system embodying various features described with reference to FIGS. 2A-17C capable of performing the automated sortation method as described with reference to FIG. 1, provides an auto bagging or auto packaging system and methodology.

In an example implementation of an auto bagging system complimentary to the automated sortation, steps S124 and S126 of FIG. 1 are further automated such that: (1) the packages that were logically tracked by the automated sortation system are dropped into a large bag, which can be configured either in a carousel 233,235 or a linear rail system 1100,1200, as described above with reference to FIGS. 2A-17C; (2) the large bag determined to be full of packages is presented for closure (zipping); (3) the bag is automatically closed (zipped), for example by a robotic system with a custom end-effector; and (4) the closed bag exits the system while a new (empty) bag is placed into the rotation to be filled.

In an example implementation, an empty bag can be placed on into the system, for example on a carousel 233, 235 or a linear rail system 1100, 1200, manually. Alternatively, the system can be configured such that multiple bags, for example a couple of hundred bags, can be loaded into the system before beginning operation and an operator could then tend to several such systems at one time to add additional bags as needed.

In an example implementation of closure with an automatic zipping component, a robot with a vision system to zip each bag can be deployed. As illustrated in an example of FIG. 18, such a system can include an electromechanical system and components 1800 comprising mechanical devices that are actuated by electricity, including without limitation pneumatics and/or magnetics, such as robotic arm 1802 in communication with one or more sensors 1804 and/or a computer processor 1806. In example embodiments, such system is configure to ensure that smaller items or parcels enter a bag or container, that such bag or container is closed by either zipping the bag or through other means (e.g., zip tie) for example by a robotic arm 1802 controlled by the processor 1806 based on stored and/or communicated information and/or command (including, without limitation, input from sensor 1804), and such bag or container is transported from the filling station to downstream processing.

In an example implementation, such a system 1800 can be capable of executing commands stored or transmitted by wire or wirelessly including specific routines and/or subroutines which execute to control the auto bagging process including the actions and timing of the electromechanical devices to, without limitation, ensure smaller items or parcels enter a bag or container, that such bag or container is closed by either zipping the bag or through other means, and such bag or container can be moved from the filling station to downstream processing.

Figure 18:
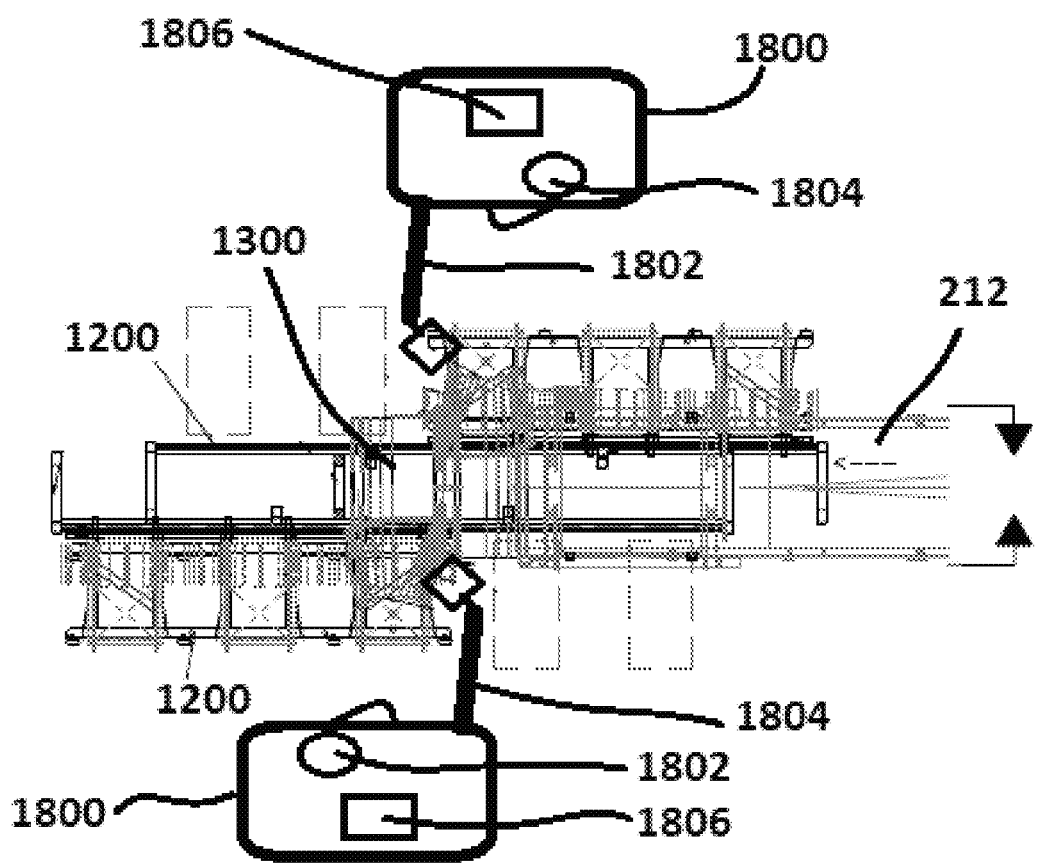
FIG. 18 illustrates in a block format a system of any example embodiment implementing an auto bagging configuration according to an example embodiment.

While example of FIG. 18 illustrates an auto bagging system components 1800 deployed to complement an automated sortation system, system 1800 can also be deployed in a stand-alone configuration adapted to automate bag closure in any system where a large quantity of bags or other containers need to be filled and closed.

One or more example embodiments described herein may provide various modes of operation for a conveyor system implementing smart bin technology including, but not limited to: manual or automated release of packages into package groups. A manual release can be based on, for example a visual inspection of the smart bin. A fully automated release can employ any of a variety of hardware and/or software configurations such as, but not limited to: a proximity sensor, a volume sensor, a weight sensor, a photo sensors, and the like, in order to automate the release based on an output and/or control thereof. One or more of the example embodiments described herein may be used in conjunction with any of a variety of package group tracking techniques, such as using zone and/or window sensors arranged on the conveyor 208 or in proximity thereof. All electronic sensing components can be integrated into an operation monitoring system and/or an automated system such as a learning computer system.

One or more exemplary embodiments provide an electromechanical system comprising a computer processor, a sensor and a robotic arm, wherein when said package group is conveyed for further processing including transferring into a container the plurality of the packages of the package group, said electromechanical system closes the container by the robotic arm controlled by the computer processor based on stored or communicated information or commands based on input from the sensor.

One or more exemplary embodiments provide an electromechanical system wherein the input from the sensor comprises an indication of the container being full to a predetermined level.

One or more exemplary embodiments provide an electromechanical system wherein the container is a bag with a zipper closure.

One or more exemplary embodiments provide an electromechanical system, wherein the robotic arm comprises a plurality of movement axis.

One or more exemplary embodiments provide an electromechanical system, wherein the robotic arm comprises and end effector configure to close the zipper closure.

One or more exemplary embodiments provide an electromechanical system, wherein the electromechanical system further comprises means for position the container to facilitate the closure of the container.

While example aspects have been shown and described with reference to certain example embodiments, it will be understood by those skilled in the art that various changes in form and details may be made therein. For example, any of various communication protocols can be deployed in combination with any of various electronic sensors, and/or any of various visual and/or audio user interfaces can be implemented to facilitate processing and/or displaying information and/or controlling hardware and/or software components of example systems.

It may be understood that example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A smart bin system comprising:
a smart bin comprising:
a plurality of walls and a bottom, together defining a cavity therewithin;
wherein the bottom comprises a gate moveable between a closed position configured to retain at least one item of a plurality of items within the cavity, and an open position configured to allow the at least one item to fall from within the cavity through the bottom;
a controller, functionally coupled to the gate and configured to move the gate between the closed position and the open position based on received data; and
an electromechanical system comprising a computer processor, a sensor and a robotic arm,
wherein, when the controller determines based on the received data that one or more of the plurality of items retained with the cavity is to be released from the cavity, the gate is moved to the open position and a slug consisting of the one or more of the plurality of items is released onto a collector conveyor via a vertical gravitational drop directly from the smart bin into a logical zone on the collector conveyor, and
wherein, when the plurality of the packages of the slug are transferred into a container,
the container is closed by the robotic arm controlled by the computer processor based on stored or communicated information or commands based on input from the sensor.

2. The smart bin system according to claim 1, wherein the received data comprises a signal received at an input of the controller from an optical sensor, the signal indicating that the smart bin is full.

3. The smart bin system according to claim 1, wherein the received data comprises at least one of:
volume of each of one or more packages within the smart bin;
weight of each of one or more packages within the smart bin;
combined volume of all packages within the smart bin; and
combined weight of all packages within the smart bin.

4. The automation system of claim 1, wherein the input from the sensor comprises an indication of the container being full to a predetermined level.

5. The automation system of claim 1, wherein the container is a bag with a zipper closure.

6. The automation system of claim 1, wherein the robotic arm comprises a plurality of movement axis.

7. The automation system of claim 6, wherein the robotic arm comprises and end effector configure to close the zipper closure.

8. The automation system of claim 1, further comprising a vision system determining a configuration of the container and/or a closure system of the container for controlling the robotic arm.

9. The automation system of claim 8, wherein vision system is in wired or wireless communication with the computer processor and/or the sensor to control the robotic arm.

10. An automated sortation system comprising:
a collector conveyor;
a plurality of smart bins each configured to
receive at least one package of a plurality of packages into a cavity including a gate, and
transfer onto the collector conveyor a package group comprising one or more of the received plurality of packages; and
an electromechanical system comprising a computer processor, a sensor and a robotic arm,
wherein
when the one or more of the received plurality of packages is to be transferred out of the cavity of corresponding one or more of the plurality of smart bins, the gate of the respective one or more of the plurality of smart bins is moved to an open position and the respective package group is released onto a collector conveyor via a vertical gravitational drop directly from each of the respective one or more of the plurality of smart bins into a respective logical zone on the collector conveyor,
the collector conveyor conveys the released package group of each of the one or more plurality of smart bins within respective logical zone on the conveyor belt for further processing as the package group of the respective one of the plurality of smart bins from which it was transferred, and
when the plurality of the packages of the package group are transferred into a container, said electromechanical system closes the container by the robotic arm controlled by the computer processor based on stored or communicated information or commands based on input from the sensor.

11. The automated sortation system according to claim 10, each of the plurality of smart bins comprising a plurality of walls and a bottom, together defining a cavity therewithin, the cavity receiving the at least one package of the plurality of packages;
wherein the bottom comprises a gate moveable between a closed position configured to retain an item within the cavity, and an open position configured to allow an item to fall from within the cavity onto the collector conveyor disposed at least partially beneath the plurality of the smart bins.

12. The automated sortation system according to claim 10, further comprising:
a cleated conveyor;
a hopper; and
a bag fill chute,
wherein
the collector conveyor is configured to convey each of the received package group as the package group onto the cleated conveyor,
the cleated conveyor is configured to convey the package group into the hopper, and
the hopper comprises a gate configured to drop the package group into a bag fill chute.

13. The automated sortation system according to claim 10, further comprising a controller configured to control the transfer of the package group from the smart bins onto the collector conveyor,
wherein the control comprises emptying the one or more of the received packages from at least one of the smart bins onto the collector conveyor based on at least one of a signal received from an optical sensor, a total volume of packages within the at least one of the smart bins, and a total number of packages within the at least one of the smart bins.

14. The automated sortation system according to claim 10, wherein the transferring of the package group from each of the smart bin onto the collector conveyor comprises transferring the package group from each of the smart bins onto a defined zone on the collector conveyor.

15. The automated sortation system according to claim 14, wherein the conveying each of the package group for further processing comprises maintaining the package group within the defined zone on the collector conveyor.

16. The automated sortation system according to claim 14, wherein the defined zone on the collector conveyor is defined between cleats on the collector conveyor.

17. The automated sortation system according to claim 14, wherein the defined zone on the collector conveyor comprises a logical accumulation zone on the collector conveyor, the logical accumulation zone lacking physical constraints on the collector conveyor.

18. The automation system of claim 10, wherein the input from the sensor comprises an indication of the container being full to a predetermined level.

19. The automation system of claim 10, wherein the container is a bag with a zipper closure.

20. The automation system of claim 19, wherein the robotic arm comprises and end effector configure to close the zipper closure.

21. The automation system of claim 10, wherein the robotic arm comprises a plurality of movement axis.

22. The automation system of claim 10, further comprising a vision system determining a configuration of the container and/or a closure system of the container for controlling the robotic arm.

23. The automation system of claim 22, wherein vision system is in wired or wireless communication with the computer processor and/or the sensor to control the robotic arm.

24. An automated sortation method comprising:
diverting a package group, comprising at least one package of a plurality of packages, into one smart bin of a plurality of smart bins according to a sort criteria;
accumulating one or more of the plurality of packages in at least the one smart bin;
transferring the one or more of the plurality of packages as a package group comprising the one or more of the plurality of packages from the one smart bin onto a collector conveyor by moving a gate of the at least one smart bins to an open position to release the package group onto the collector conveyor via a vertical gravitational drop directly from the at least one smart bin into a respective logical zone on the collector conveyor;
moving the released package group of the at least one smart bin within respective logical zone on the collector conveyor as the package group of the at least one smart bin from which it was release;
transferring into a container the plurality of the packages of the package group; and
closing the container by a robotic arm controlled by a computer processor based on stored or communicated information or commands based on input from a sensor.

25. The automated sortation method according to claim 24, further comprising:
moving the package group from the collector conveyor onto a cleated conveyor; and
moving the package group along the cleated conveyor and into a hopper.

26. The automated sortation method according to claim 25, further comprising releasing each package of the package group from the hopper into one of a plurality of chutes, and thereby into a bag.

27. The automated sortation method according to claim 24, wherein the transferring of the package group comprises emptying the one or more of the accumulated packages from the smart bin onto the collector conveyor based on at least one of a signal received from an optical sensor, a total volume of packages within the one smart bin, and a total number of packages within the one smart bin.

28. The automated sortation method according to claim 24, wherein the transferring the package group from the one smart bin onto the collector conveyor comprises opening a gate of the one smart bin and thereby dropping the package group from the one smart bin onto the collector conveyor.

29. The automated sortation method according to claim 24, wherein the transferring the package group from the one smart bin onto the collector conveyor comprises transferring the package group onto a defined zone on the collector conveyor.

30. The automated sortation method according to claim 29, wherein the moving the package group along the collector conveyor comprises maintaining the package group within the defined zone on the collector conveyor.

31. The automated sortation method according to claim 29, wherein the defined zone on the collector conveyor is defined between cleats on the collector conveyor.

32. The automated sortation method according to claim 29, wherein the defined zone on the collector conveyor comprises a logical accumulation zone on the collector conveyor, the logical accumulation zone lacking physical constraints on the collector conveyor.

33. The automated sortation method according claim 24 further comprising positioning the container to facilitate the closing of the container by the robotic arm.

34. The automation system of claim 24, wherein the input from the sensor comprises an indication of the container being full to a predetermined level.

35. The automation system of claim 24, wherein the container is a bag with a zipper closure.

36. The automation system of claim 24, wherein the robotic arm comprises a plurality of movement axis.

37. The automation system of claim 36, wherein the robotic arm comprises and end effector configure to close the zipper closure.

38. The automation system of claim 24, further comprising a vision system determining a configuration of the container and/or a closure system of the container for controlling the robotic arm.

39. The automation system of claim 38, wherein vision system is in wired or wireless communication with the computer processor and/or the sensor to control the robotic arm.

* * * * *